United States Patent
Wild

(10) Patent No.: US 11,283,516 B1
(45) Date of Patent: Mar. 22, 2022

(54) MULTI SPOKE BEAMFORMING FOR LOW POWER WIDE AREA SATELLITE AND TERRESTRIAL NETWORKS

(71) Applicant: Hubble Network Inc, Las Vegas, NV (US)

(72) Inventor: Ben Juda Wild, Seattle, WA (US)

(73) Assignee: Hubble Network Inc, Las Vegas, NV (US)

( * ) Notice: Subject to any disclaimer, the term of this patent is extended or adjusted under 35 U.S.C. 154(b) by 0 days.

(21) Appl. No.: 17/391,914

(22) Filed: Aug. 2, 2021

(51) Int. Cl.
| | |
|---|---|
| H03D 1/00 | (2006.01) |
| H04B 7/185 | (2006.01) |
| H04B 7/06 | (2006.01) |
| H01Q 21/06 | (2006.01) |

(52) U.S. Cl.
CPC ......... *H04B 7/18515* (2013.01); *H01Q 21/06* (2013.01); *H04B 7/0617* (2013.01)

(58) Field of Classification Search
CPC .. H01Q 1/244; H04B 7/18563; H04B 17/336; H04B 1/02; H04L 27/2602; H04L 27/2627; H04L 27/2646
USPC .......... 455/575.1, 575.7, 428, 430; 370/208; 375/340, 341
See application file for complete search history.

(56) References Cited

U.S. PATENT DOCUMENTS

| | | | |
|---|---|---|---|
| 2002/0075797 A1* | 6/2002 | Kilani | H04L 27/2675 370/208 |
| 2005/0271165 A1* | 12/2005 | Geraniotis | H04L 23/02 375/340 |
| 2007/0183542 A1* | 8/2007 | Geraniotis | H04L 1/005 375/341 |
| 2009/0125780 A1* | 5/2009 | Taylor | H04L 1/0071 714/752 |
| 2019/0064364 A1* | 2/2019 | Boysel | G01S 7/52004 |
| 2019/0207676 A1* | 7/2019 | Noerpel | H04B 7/2041 |
| 2019/0288898 A1* | 9/2019 | Ibrahim | H04L 27/2627 |

* cited by examiner

Primary Examiner — Tan H Trinh
(74) Attorney, Agent, or Firm — Womble Bond Dickinson (US) LLP

(57) ABSTRACT

Wireless communication method and apparatus to enable communications between a plurality of endpoints and a satellite or terrestrial gateway integrated with a plurality of oblong shaped antenna arrays. The wireless communication method leverages data symbols that are orthogonally modulated. The method permits the use of a plurality of compact oblong shaped antenna arrays to increase network capacity and reduce endpoint power consumption.

9 Claims, 34 Drawing Sheets

MULTI SPOKE BEAMFORMING FOR LOW POWER WIDE AREA SATELLITE AND TERRESTRIAL NETWORKS

FIELD OF THE INVENTION

The present application relates to apparatuses and methods to enable high capacity satellite and terrestrial low power wide area networks for connecting Internet of Things (IoT) devices to the internet.

BACKGROUND

Low power wide area networks (LPWAN) are used to connect battery powered sensors and other Internet of Things (IoT) devices, that are referred to herein collectively as "endpoints", to the internet over long distances. As the demand for LPWAN connectivity services grows, there is a growing need for (1) connectivity that is low cost and reliable at a global scale and (2) a network that can scale to Billions of IoT endpoints. Low cost connectivity at a global scale is challenging due to the cost of installing terrestrial gateways across the vast area required to cover the world's land mass. Furthermore, providing connectivity over oceans is not possible with terrestrial gateways. Scaling to Billions of IoT devices at a low cost is also challenging due to the high cost of licensed spectrum and the limited amount of unlicensed spectrum available.

One approach to reduce the cost of building a LPWAN and improving the wireless network capacity is to leverage the spatial domain by using multiple antennas at the gateway, where the antennas operate together to transmit or receive a given signal, this is called beamforming. Wireless receive beamforming leverages a plurality of antennas to collect radio energy from one or more specific directions. Wireless transmit beamforming leverages a plurality of antennas to focus radio energy towards one or more specific directions. Beamforming antenna arrays are typically arranged as either one dimensional antenna arrays called linear arrays or two dimensional antenna arrays. A two dimensional antenna array is typically arranged as a square antenna array but can also be oblong shaped. A linear antenna array is able to focus the wireless energy along only one dimension (the dimension along the line formed by the antenna array). A square antenna array is able to focus the wireless energy along both dimensions of the array. The radio beam that is formed along a specific dimension of the antenna array has a beam width that is proportional to the size of the antenna array along the respective dimension.

Wireless beamforming technology enables radios to use the spatial domain in addition to the time and frequency domains to improve range, reliability and capacity. Single antenna radios are limited to leveraging time and frequency resources within the geographic region in which the antenna points towards. Constructing large antenna arrays typically requires a large volume, making it difficult to integrate into small satellites.

Satellites integrated with radio gateways can serve as a global low power wide area network platform for connecting sensors and other IoT endpoints to the internet. Because satellites typically have an altitude of around 500 Km or greater, significant coverage is provided even with a single satellite. The downside of having significant coverage is that a radio gateway mounted on a satellite needs to handle a higher level of uplink and downlink traffic than terrestrial gateways need to handle due to the larger geographic areas covered by the satellite. The second challenge with satellites are the high launch costs, where the costs typically increase linearly with the volume of the satellite. It is thus preferred to design a satellite to be as small as possible to minimize cost while at the same time providing adequate network capacity to handle a large number of endpoint traffic. This disclosure discusses apparatuses and methods that leverages a plurality of oblong shaped antenna arrays to minimize satellite volume while maximizing wireless network capacity for satellite based gateways and also discusses the applicability to terrestrial based gateways.

BRIEF SUMMARY OF THE INVENTION

Offered is an apparatus for building satellite based wireless communication gateways. The apparatus comprises of a plurality of oblong shaped antenna arrays that are not parallel to each other, each antenna array comprising of foldable modules that fold into the satellite housing. Each module comprising radio beamforming circuitry and solar cells to enable small volume satellites with high network capacity.

Offered is a method to decode orthogonally modulated symbols from a plurality of oblong shaped antenna arrays, where the antenna arrays are mounted either on a satellite, aircraft or earth based structures. The method allows for higher network capacity and lower endpoint energy consumption compared to a gateway that uses a single square antenna array of equivalent volume.

Offered is a method to correct for Doppler shifts of endpoint radio transmissions arriving at a moving satellite that includes a plurality of oblong shaped antenna arrays.

Offered is a method to estimate the position and attitude of a satellite that is mounted with a plurality of oblong shaped antenna arrays. The method leverages ground based transmitters with known positions. The method can complement or replace other satellite position and attitude estimation methods such as using magnetic sensors and star trackers for attitude estimation and using the Global Positioning System (GPS) for position estimation.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The above and other aspects, features and advantages of the present invention will become more apparent from the subsequent description thereof, presented in conjunction with the following drawings, wherein.

DETAILED DESCRIPTION

Figure 1:
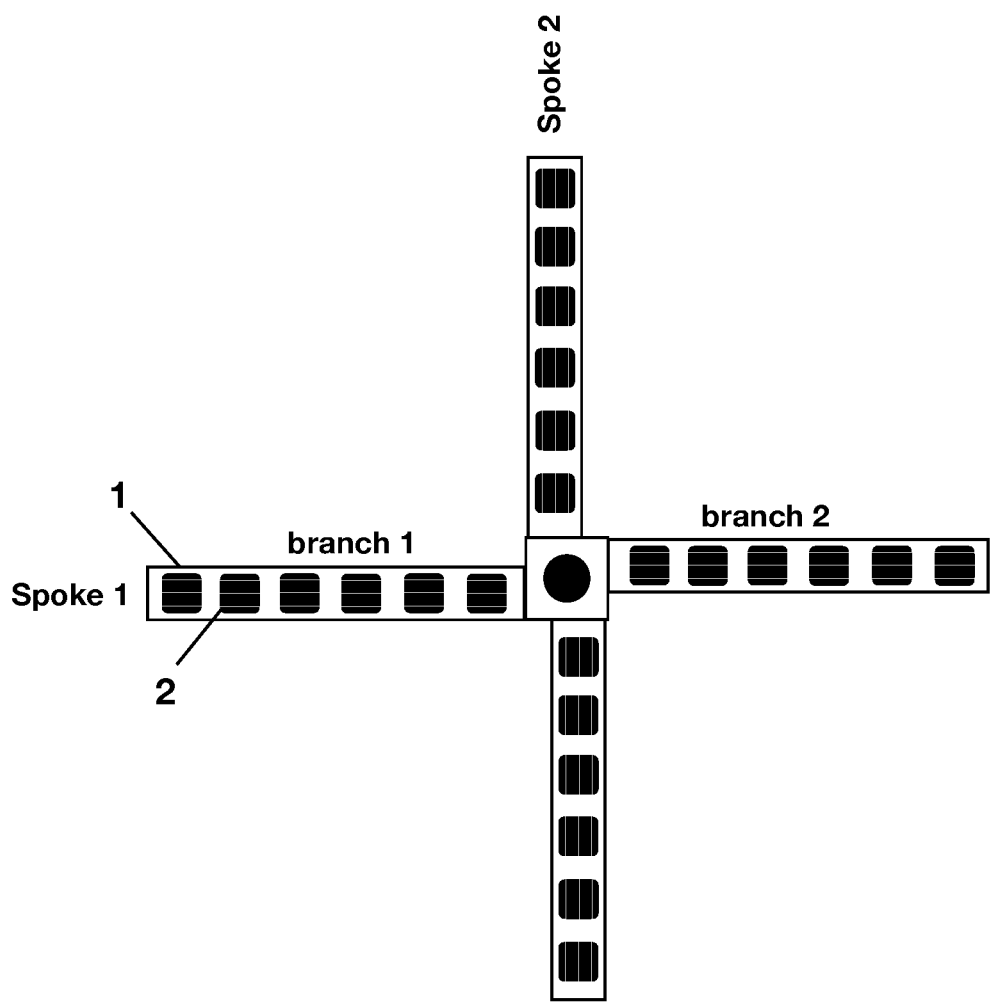
FIG. 1 is a top view of a satellite integrated with two linear antenna arrays.
Figure 2:
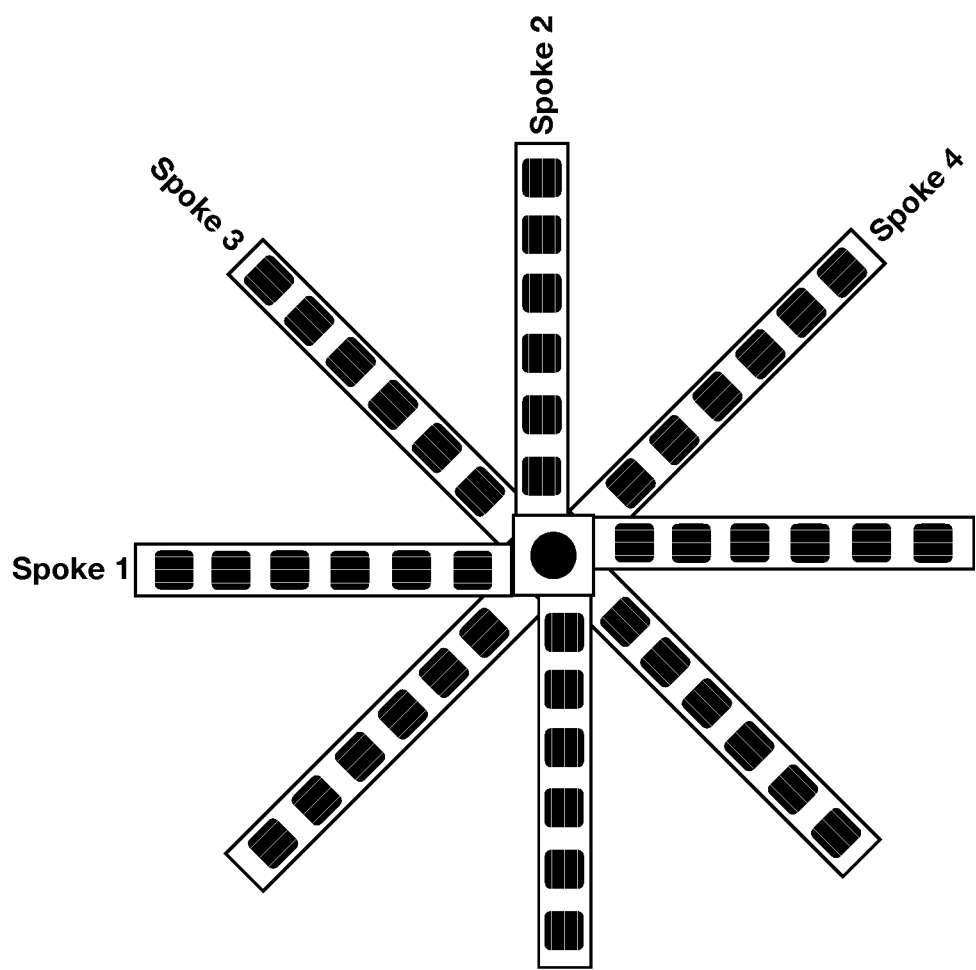
FIG. 2 is a top view of a satellite integrated with four linear antenna arrays.
Figure 3A:
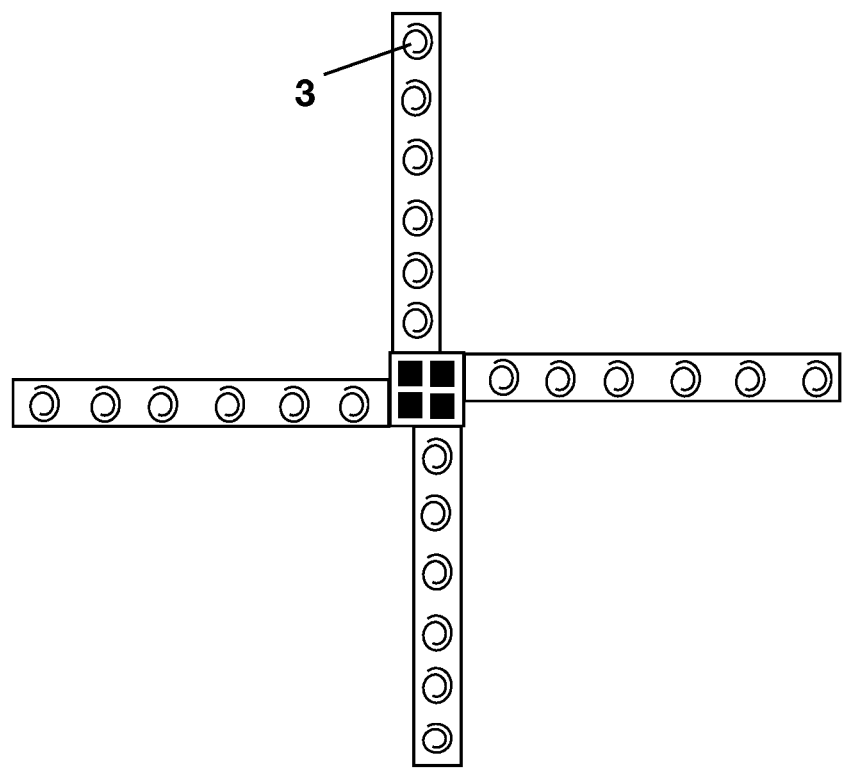
FIG. 3A is a bottom view of a satellite integrated with two linear antenna arrays.
Figure 3B:
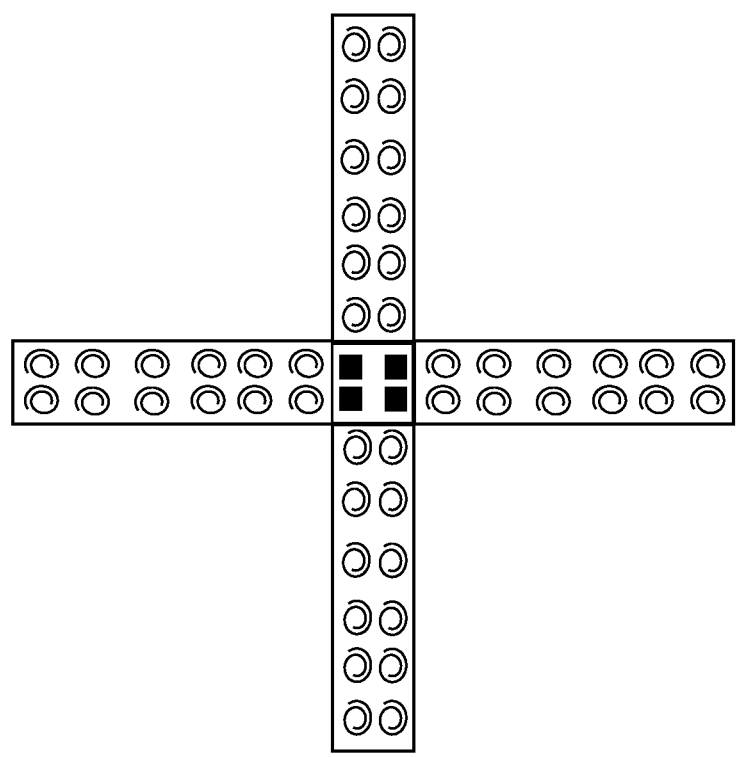
FIG. 3B is a bottom view of a satellite integrated with two rectangular antenna arrays.
Figure 4:
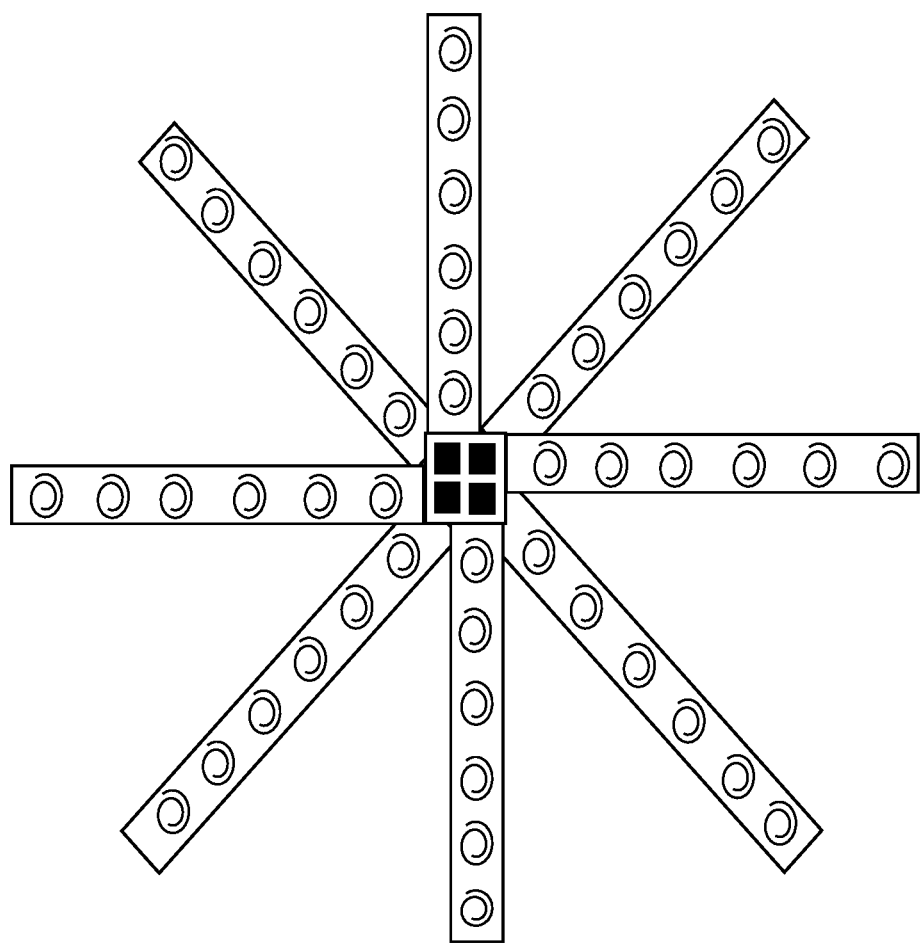
FIG. 4 is a bottom view of a satellite integrated with four linear antenna arrays.
Figure 5:
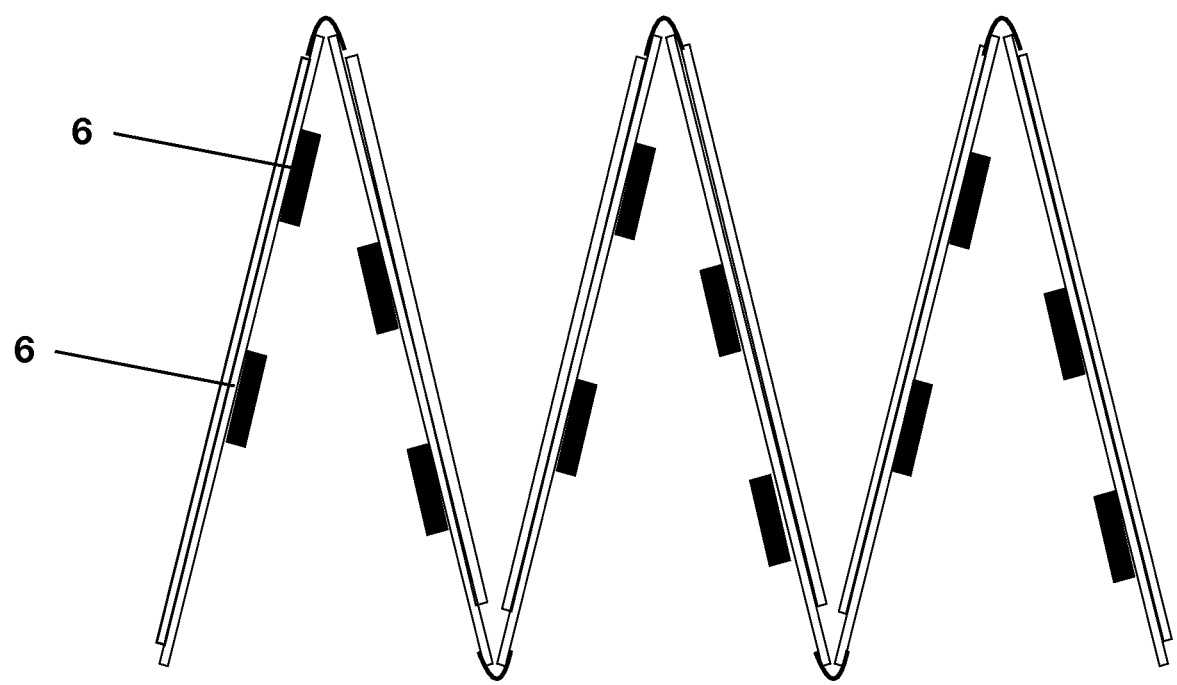
FIG. 5 is a side view of a linear antenna array that is partially folded.
Figure 6:
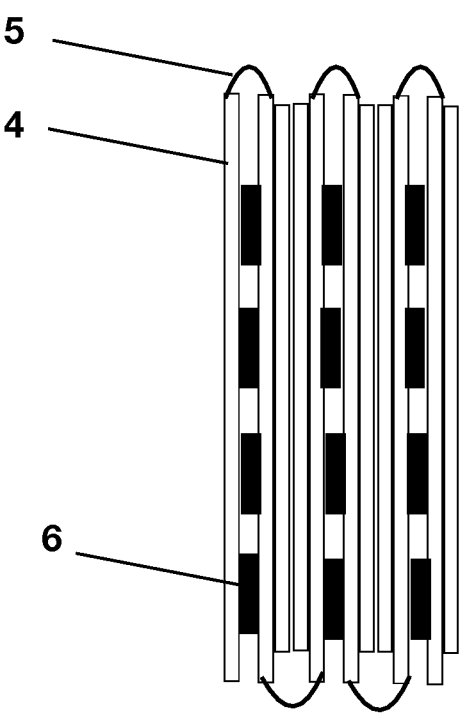
FIG. 6 is a side view of a linear antenna array that is fully folded.
Figure 7:
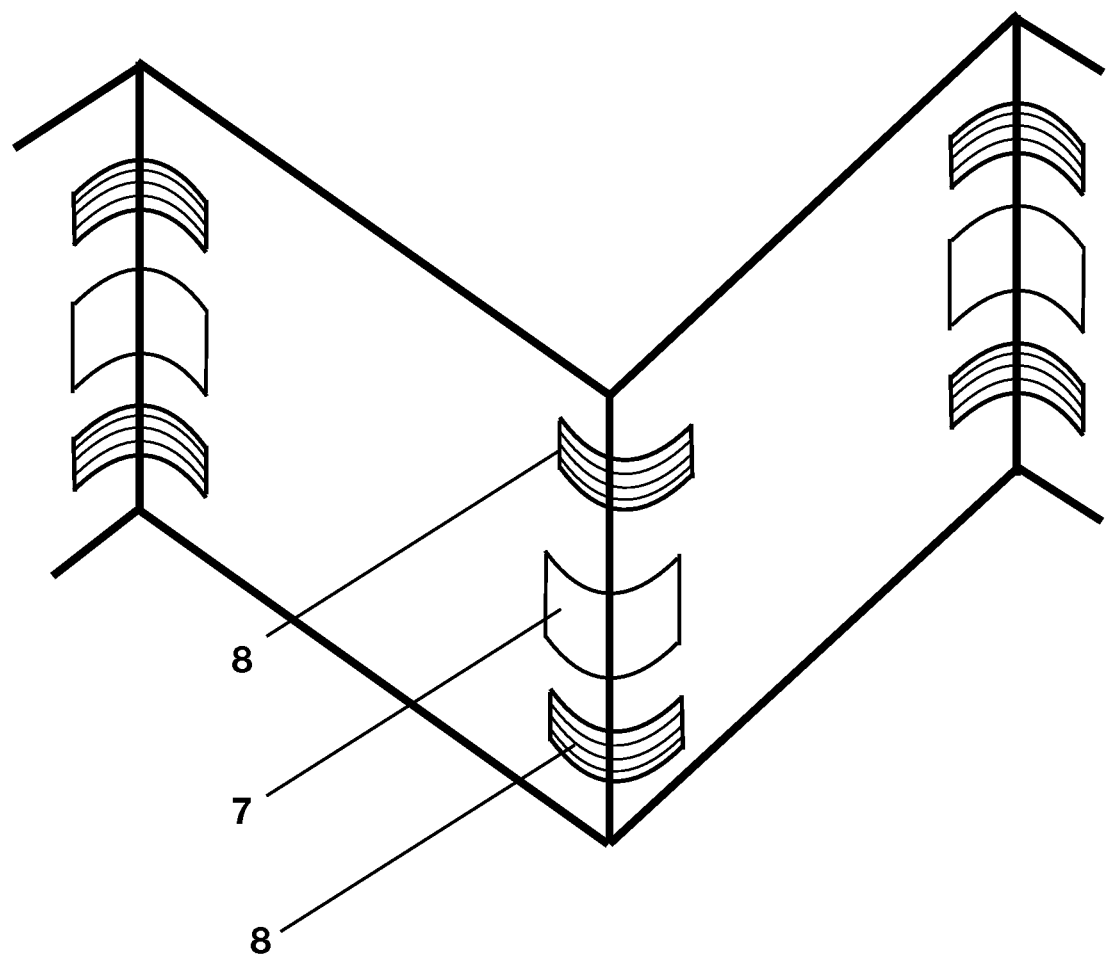
FIG. 7 illustrates multiple antenna modules interconnected with each other.

This disclosure is directed to wireless communication methods that enhance the performance of radio systems that leverage a plurality of oblong shaped antenna arrays. In the disclosure, an oblong shaped antenna array is also referred to as an antenna spoke. FIG. 1 illustrates a top view of a satellite which includes two linear antenna spokes 1. The embodiment in FIG. 1 includes solar cells 2 mounted on the top of the antenna array for powering the satellite electronics. Each antenna spoke has two branches that can optionally be offset in space as shown in the figure to allow for more flexibility when mounting inside a satellite housing. FIG. 2 illustrates a satellite with 4 antenna spokes. Alternate embodiments can include any plurality of antenna spokes. The antennas for each spoke are mounted so that the array of antennas are nadir facing (point towards the earth). FIG. 3A illustrates a bottom view of a two spoke linear antenna array mounted on a satellite with antennas 3 mounted along the spokes. FIG. 3B illustrates a bottom view of a two spoke rectangular antenna array where each spoke is two antennas wide. In an embodiment, antenna elements are spaced by around ½ of a wavelength of the radio carrier wave, alternate embodiments can have antenna spacing with smaller or larger spacing. Larger antenna spacing provides increased spatial resolution but increases the volume of the antenna array. FIG. 3A and FIG. 3B illustrate antenna arrays that use helical antenna elements, but other types of antenna elements that can be used include but are not limited to a monopole antenna, dipole antenna, or an aperture fed or probe fed patch antenna. FIG. 4 illustrates the bottom view for a 4 spoke linear antenna array. The antenna spokes consist of one or more foldable modules where each module contains one or more antennas. Each antenna spoke is stowed away inside the satellite housing in a folded configuration before the satellite is deployed. FIG. 5 illustrates an embodiment of the antenna spoke which contains two antennas 6 per module in a partially folded configuration and FIG. 6 illustrates the spoke in a fully folded configuration. The antenna modules are interconnected both mechanically and electrically 5 along the edges of the circuit boards 4. One of the electrical wires distributes a common Radio Frequency (RF) local oscillator signal from a separate module inside the satellite housing to all of the antenna modules. In an alternate embodiment, the RF local oscillator is distributed from one of the modules to the rest of the modules. One or more of the wires carry either raw or processed complex baseband data from each antenna module and distribute the data to other modules or a processor mounted inside the satellite housing to be used in the packet decoding process. In an alternate embodiment, the communication between modules is done via wireless communication instead of wired communication. In an embodiment, the antennas are arranged on alternate modules such that when the modules are folded, the antennas fold more compactly by not overlapping with adjacent module antennas 6. FIG. 7 illustrates more details of the electrical and mechanical connections between the antenna module circuit boards. One or more tape springs 7 made out of steel or a composite material is attached along the edges of the antenna module circuit boards and exerts torque on adjacent antenna modules to unfold the antenna modules from the folded configuration when the antenna modules are not held inside the satellite housing. One or more flexible PCBs 8 are used to electrically connect adjacent antenna module circuit boards. Since the antenna array operates in a zero gravity environment, only a small torque is necessary to expand the folded antenna modules out into a straight array.

Figure 8:
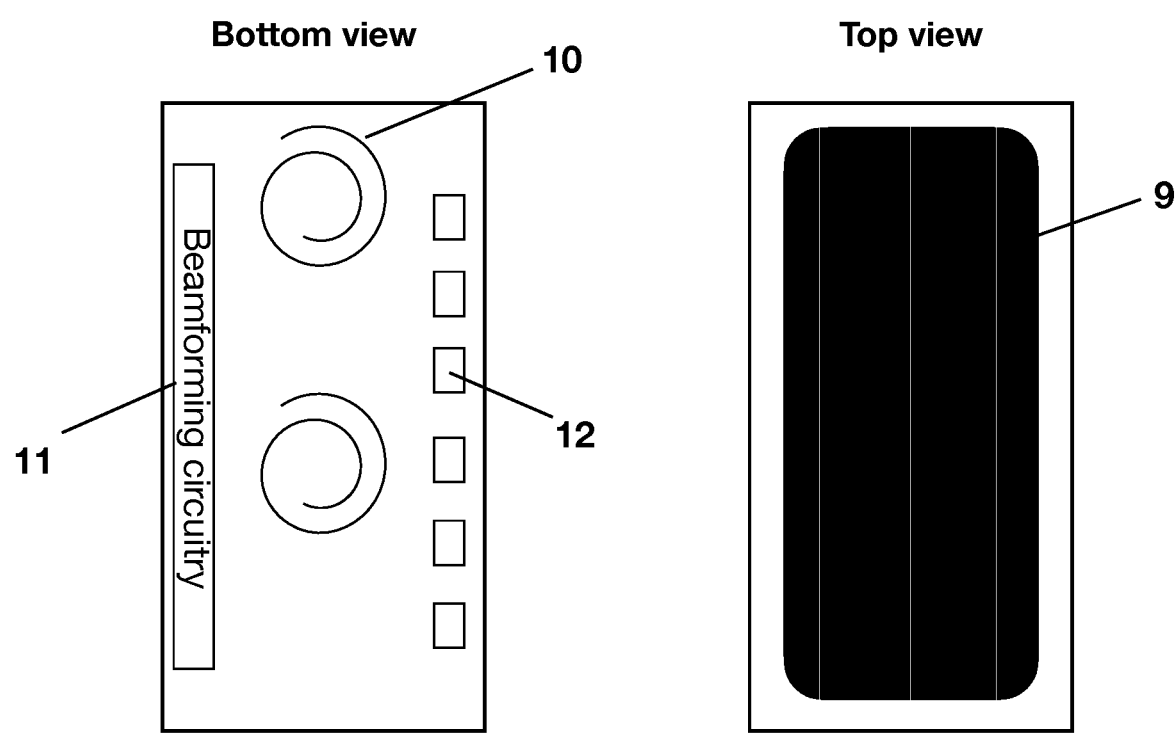
FIG. 8 is a top and bottom view of an antenna module.

The top and bottom view of an embodiment of a module used to construct a linear antenna array is shown in FIG. 8, where each module is manufactured from circuit board material and is mounted with a solar cell 9, one or more antenna elements 10, and RF, analog and digital beamforming circuitry 11. In an embodiment, to increase the compactness of the folded antenna modules, openings in the circuit board consisting of slots or holes 12 are integrated into the module circuit board material which allows for the beamforming and other electronic components from adjacent modules to fit into the slots or holes when the modules are folded. In an alternate embodiment, the solar cells can be mounted separately on the satellite housing, however mounting on the antenna module itself can provide additional volume efficiency. The module circuitry and solar cell is assembled on a glass reinforced epoxy laminate material or it can also be assembled on Teflon or other materials that allow for mounting of electronic components.

Figure 9:
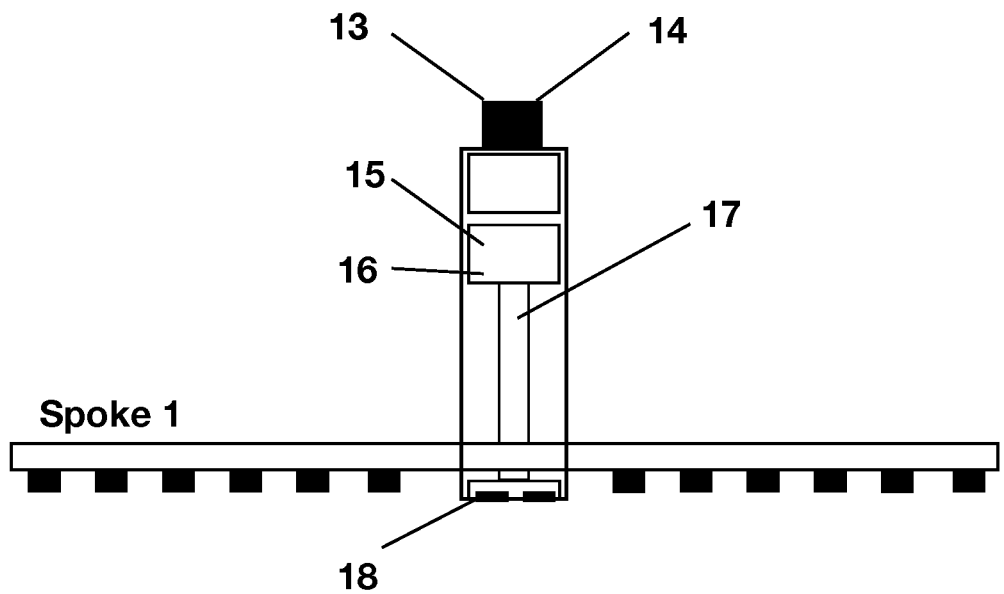
FIG. 9 is a side view of a satellite with two linear antenna arrays.
Figure 10:
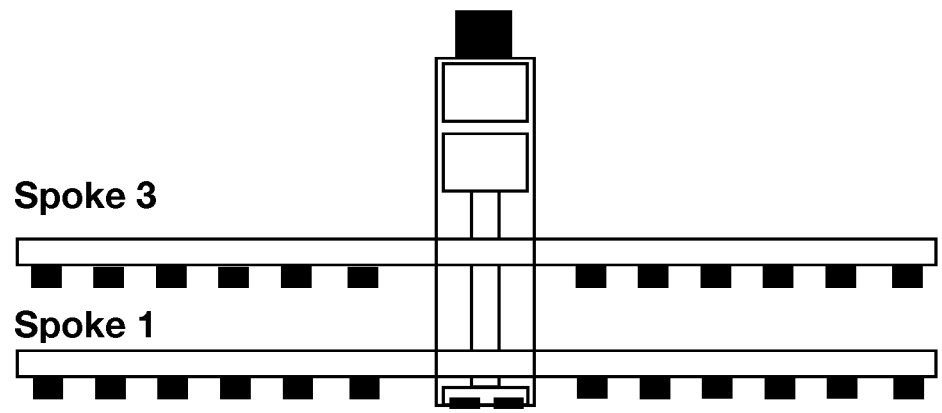
FIG. 10 is a side view of a satellite with four linear antenna arrays.

For better visualization, a side view of a satellite integrating linear antenna arrays is shown in FIG. 9. The figure shows one of the spokes. The second spoke in the illustrated embodiment is perpendicular to the first spoke and is not shown in the figure. The spoke antenna elements point towards the earth as the satellite orbits. A GPS receiver 13 is used by the satellite to estimate its position. Magnetic sensors and a star tracker 14 are used to estimate the satellite attitude (roll, pitch and yaw). Magnetorquers 15 and reaction wheels 16 are mounted inside the satellite housing and are used to control the satellite attitude. Batteries 17 contained within the satellite housing are used to provide power to the satellite electronics when the satellite is orbiting in the eclipse portion of the orbit. A separate bidirectional radio link 18 is used to communicate with one or more ground stations on earth. This radio link is used to send the collected endpoint packet data back down to earth and receive commands or firmware updates from the ground stations. The antenna spokes can be designed to be either one way (earth to satellite) or bidirectional. In the bidirectional case, the antenna spokes can be dual purposed to send data to either endpoints or to send data back to a ground station using the same frequency band as the endpoint to satellite band. This would be done by time multiplexing the communication channel when the spoke antennas are single band antennas (this is called Time Division Duplexing). In an alternate embodiment, the antenna spokes are designed to be dual band, in this case, the antenna spokes can transmit on one frequency band and receive on a second frequency band simultaneously (this is called Frequency Division Duplexing). FIG. 10 illustrates a side view of a satellite that has 4 antenna spokes. Two of the antenna spokes that are perpendicular to spokes 1 and 3 are not shown. Spoke 1 and spoke 3 in the figure are at a 90 degree relative yaw angle to each other, although not depicted in the figure. To increase the compactness of the stowed antenna spokes in the four antenna spoke case, in the embodiment the antenna spokes are placed in different z positions as shown in the figure.

Figure 11:
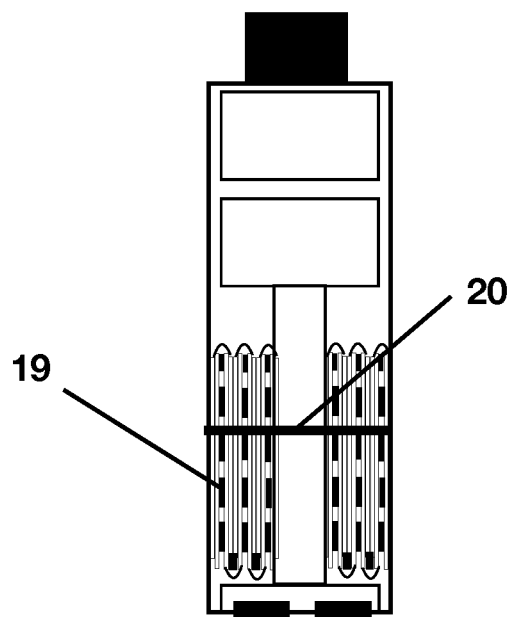
FIG. 11 is a side view of a satellite with linear antenna arrays folded inside.
Figure 12:
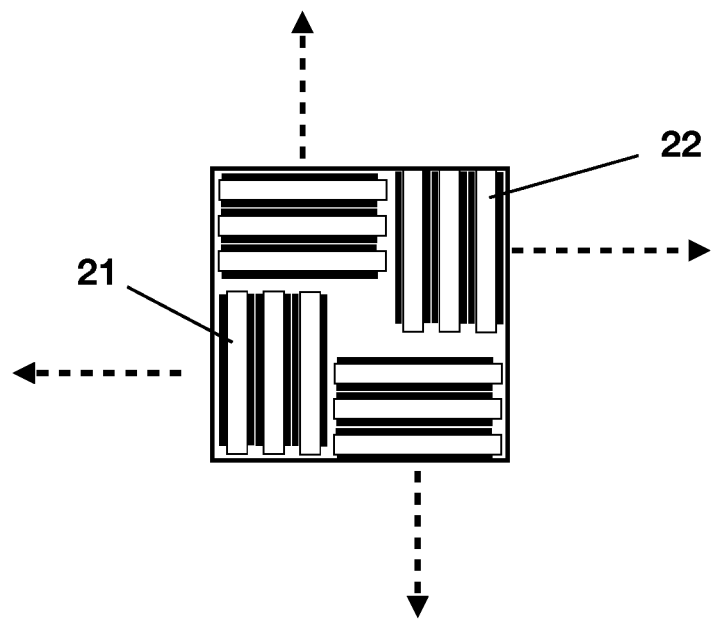
FIG. 12 is a top view of a satellite with two linear antenna arrays folded inside.

FIG. 11 illustrates the side view of a satellite with the antenna spokes 19 stowed inside the satellite. For clarity, only one of the spokes which has two branches is shown in the figure. When the antenna modules are stowed away inside the satellite, they are held in place by either a burn wire 20 or mechanical door with a solenoid to release the door. Alternate embodiments can have other release mechanisms such as magnetic latches. Once the burn wire is burned or the mechanical door is opened, the antenna modules expand out and form two or more antenna spokes. FIG. 12 shows a top view of the stowed antenna arrays for a two spoke configuration with two branches per spoke. The arrows show the direction in which the spokes expand out. The figure illustrates the spoke branches 21,22 where each branch has half the antenna elements that a full spoke has. This makes it simpler to stow away in a small volume. All antenna spokes and branches are electrically connected either to each other or to a central processor to allow for the necessary signal processing of the down converted received signals, decoding the received packets and sending the packets down to a earth based ground station.

Figure 13A:
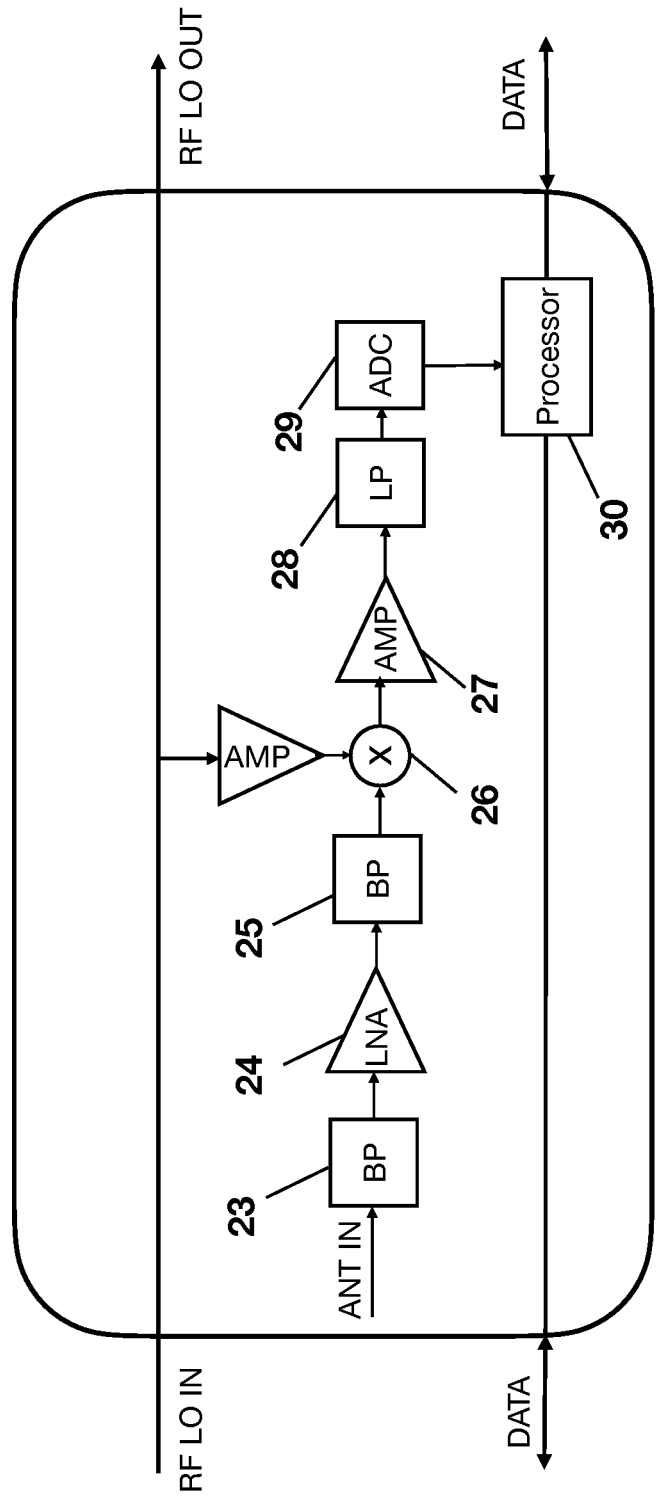
FIG. 13A is a block diagram of an antenna module receiver electronics.

The block diagram of an embodiment of the antenna module receive electronics is illustrated in FIG. 13A. The circuit is used to downconvert the RF signal to baseband and process the downconverted received signal. Each antenna on the module feeds into a band pass filter 23 followed by a low noise amplifier (LNA) 24. An additional band pass filter 25 can optionally follow the LNA to further reduce out of band noise. An RF mixer 26 down converts the incoming signal to a lower intermediate frequency (IF). The mixer is followed by an amplifier 27 and an anti aliasing filter 28. The down converted signal is then fed into an Analog to Digital converter (ADC) 29. The digitized signal is fed into a digital processor 30. The processor can be a microprocessor, a field programmable gate array or a custom digital ASIC. The processor receives baseband signals from antenna modules in the array and performs computations on the signals as described herein below. In an alternate embodiment, the signal processing can be done on a processor that is not located on the antenna array module but is located inside the satellite main housing on a separate PCB. In an embodiment, the packet decoding is performed locally on the satellite. In an alternate embodiment, the raw or partially processed down converted and digitized complex baseband signals from each antenna can be sent down to a ground station directly. When the satellite sends the complex baseband signals directly to the ground station, the packet decoding process would be performed at a computer or server located on earth. Sending the received complex baseband signals directly down to a ground station will however require higher satellite to ground station communication bandwidth.

Figure 13B:
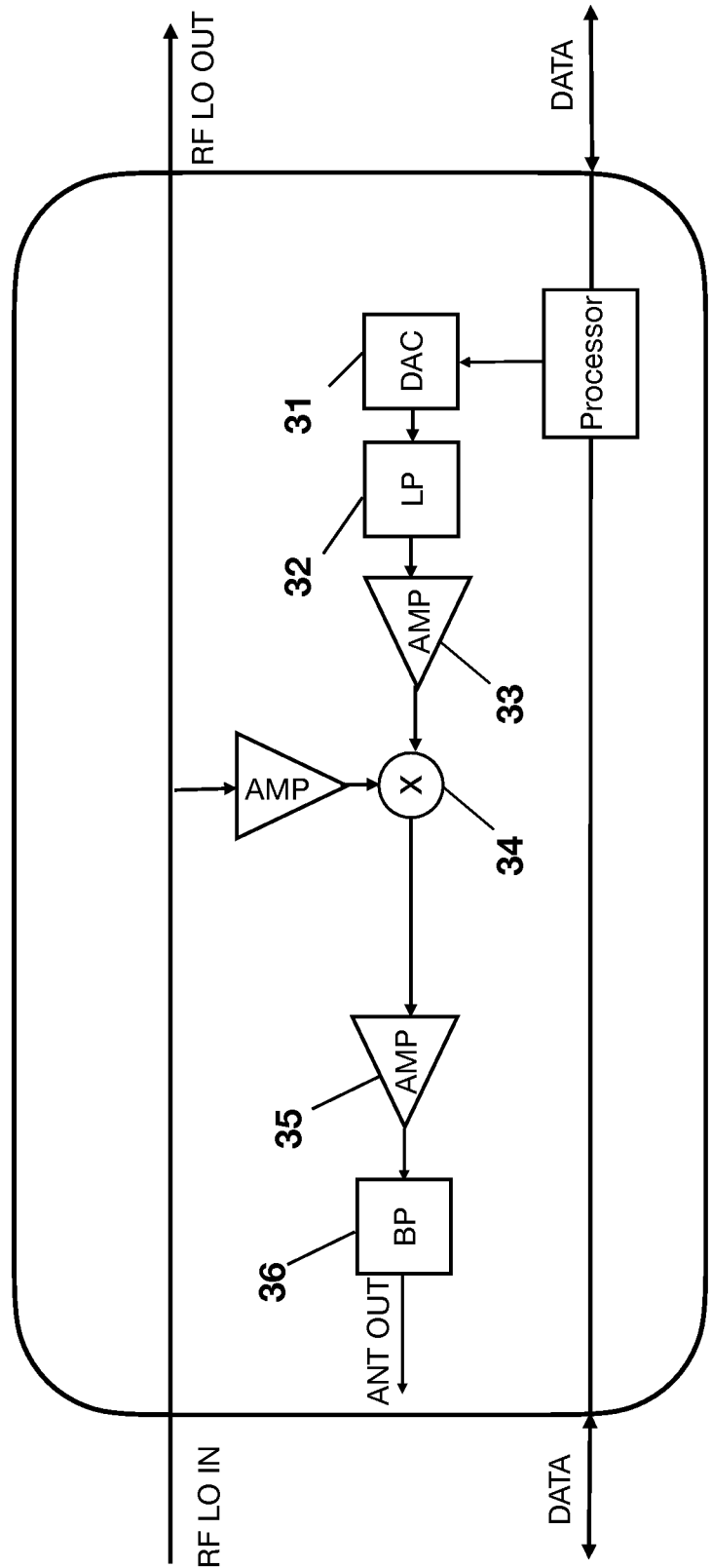
FIG. 13B is a block diagram of an antenna module transmitter electronics.

In an embodiment, antenna modules are designed to provide bidirectional communication with endpoints on the ground by integrating transmit radio electronics into the modules. FIG. 13B illustrates the transmit electronics circuitry, which includes a Digital to Analog converter 31 (DAC) which receives the digitized, discrete time complex baseband information that is to be modulated onto the carrier and converts it into an analog continuous time signal. The complex baseband signal can optionally be injected into a lowpass filter 32 to filter out any unwanted out of band signals and then the signal is amplified 33 and quadrature mixed 34 with the local oscillator signal. The signal is then further amplified 35, and optionally filtered 36 to reduce any out of band harmonics and the signal is then sent to the antenna. The receive and transmit electronics can share the same antenna by time division duplexing the channel or by using a dual band antenna which allows for frequency division duplexing. In an alternate embodiment, separate transmit and receive antennas are mounted on each antenna module to avoid the need to share antennas between the transmit and receive circuits. In the transmit direction, the gain and phase of the complex baseband signal are selected to allow for pointing one or more transmit beams in the direction of one or more endpoints. Multiple beams where each beam contains a different packet transmission can be created simultaneously with the correct choice of gains and phases both in the transmit and in the receive direction. The signal processing performed on the received signals is described in the next section.

Figure 14:
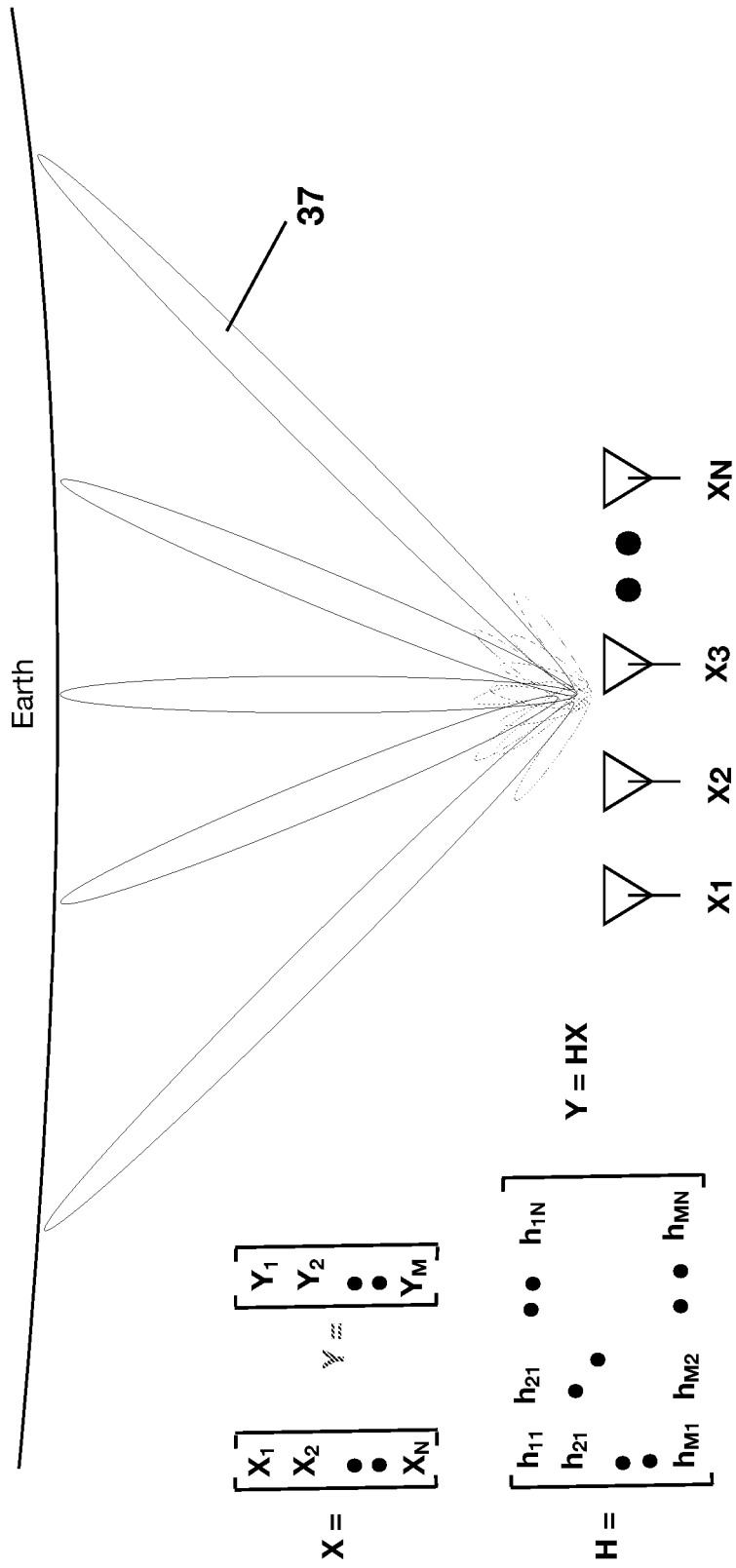
FIG. 14 depicts multiple receive radio beams being generated by a linear antenna array with N antenna elements.

Each antenna array spoke is programmed to receive radio energy from several focused zones that can have a varying degrees of beam overlap. For an N antenna linear array, there are approximately N/2 beams that have small spatial overlaps in their radio receive beams over the span of elevation angles from −45 degrees to 45 degrees. Although any number of M beams can be formed which could have varying degrees of spatial overlap among the beams. Higher beam overlap allows for better positioning accuracy of endpoint radio transmissions. Furthermore, since satellites travel at around 7.8 km/s in Low Earth Orbit, the beam overlap also provides redundancy if an endpoint transmission is long enough to cross from one beam zone into an adjacent beam zone. FIG. 14 illustrates the computations necessary to create M focused receive beams 37 for a linear antenna array. The received baseband signals at each of the N antennas is denoted by $x_1$ through $x_N$. These signals are multiplied by a beamformer matrix, denoted by H. To create a beam, the beamformer matrix phase shifts the received signals at antenna k relative to k−1 by a constant phase shift that depends on the spacing between the antennas and the elevation angle of the beam to be formed. The phase shifted signals from each antenna are then accumulated together. The phase shift is chosen to add the radio energy at each antenna in phase to maximize the signal strength for a specific beam direction. The phase shift is computed by calculating the phase difference in the radio arrival signal at each antenna for a specific beam elevation angle along the direction of the antenna array. These phase shift values are then used by the beamformer matrix in the signal processing to align all the received signal phases by multiplying the incoming baseband signals by the complex conjugate of the complex exponents representing the predicted arrival radio wave phase shifts for each beam elevation angle. When antenna spokes are broken into two branches that are offset in space, the phase shift computation is adjusted to take into account the offset between the branches. Each incoming baseband signal can also be multiplied by a gain factor to trade off a wider width of the main beam lobe for a smaller amplitude of the side lobes of the beams. To create M beams using an N antenna linear array requires a matrix, H of size M×N which multiplies the incoming baseband signals by the complex exponents (and possibly gains for tapering) to create the necessary phase shifts to align the receive signals and create the beams. The phase shifts used in the receive direction to form beams at specific elevation angles can also be used in the transmit direction to form transmit beams along the same elevation angles. In an alternate embodiment, the beamformer matrix, H is chosen such that the beams generated sweep the ground to counter the motion of the satellite and also adjusted to counter any changes in the satellite attitude. In this case, each beam would be focused on a specific zone on earth and the beam coverage zone would not move with the satellite motion. The beamformer matrix, H would be composed of time varying complex exponents in this case.

Figure 15:
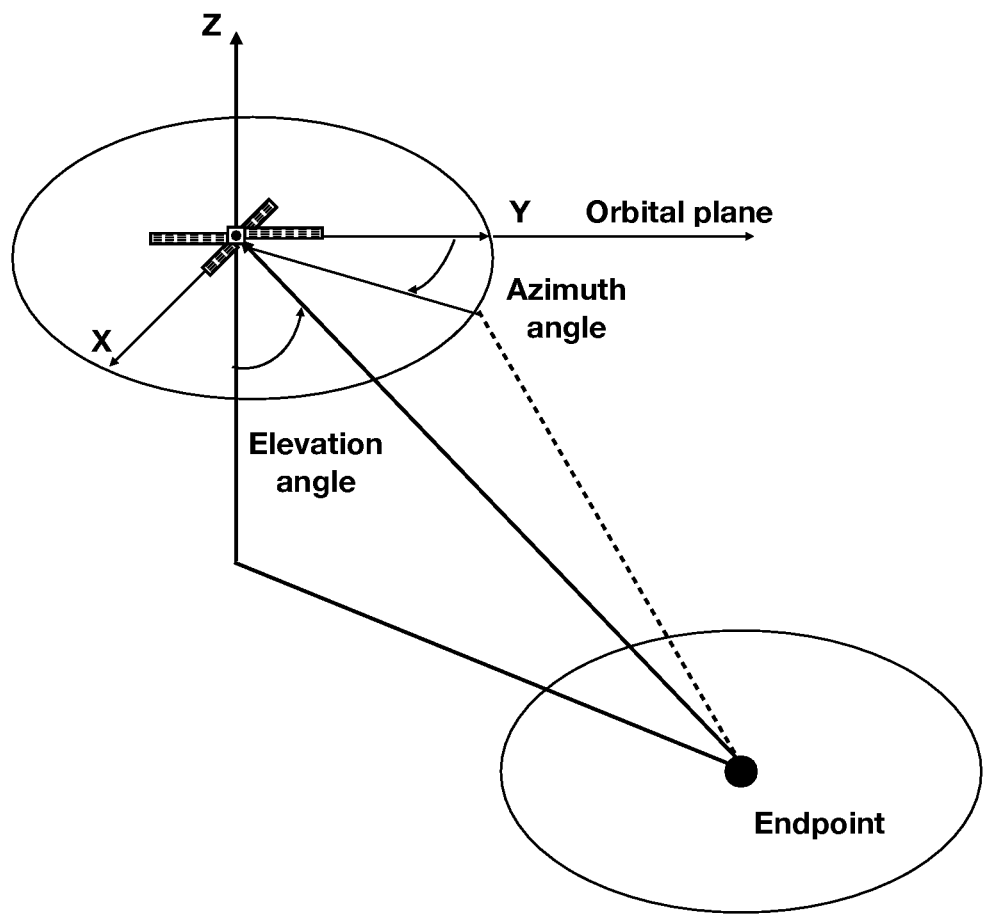
FIG. 15 illustrates the orbital frame of reference.
Figure 16:
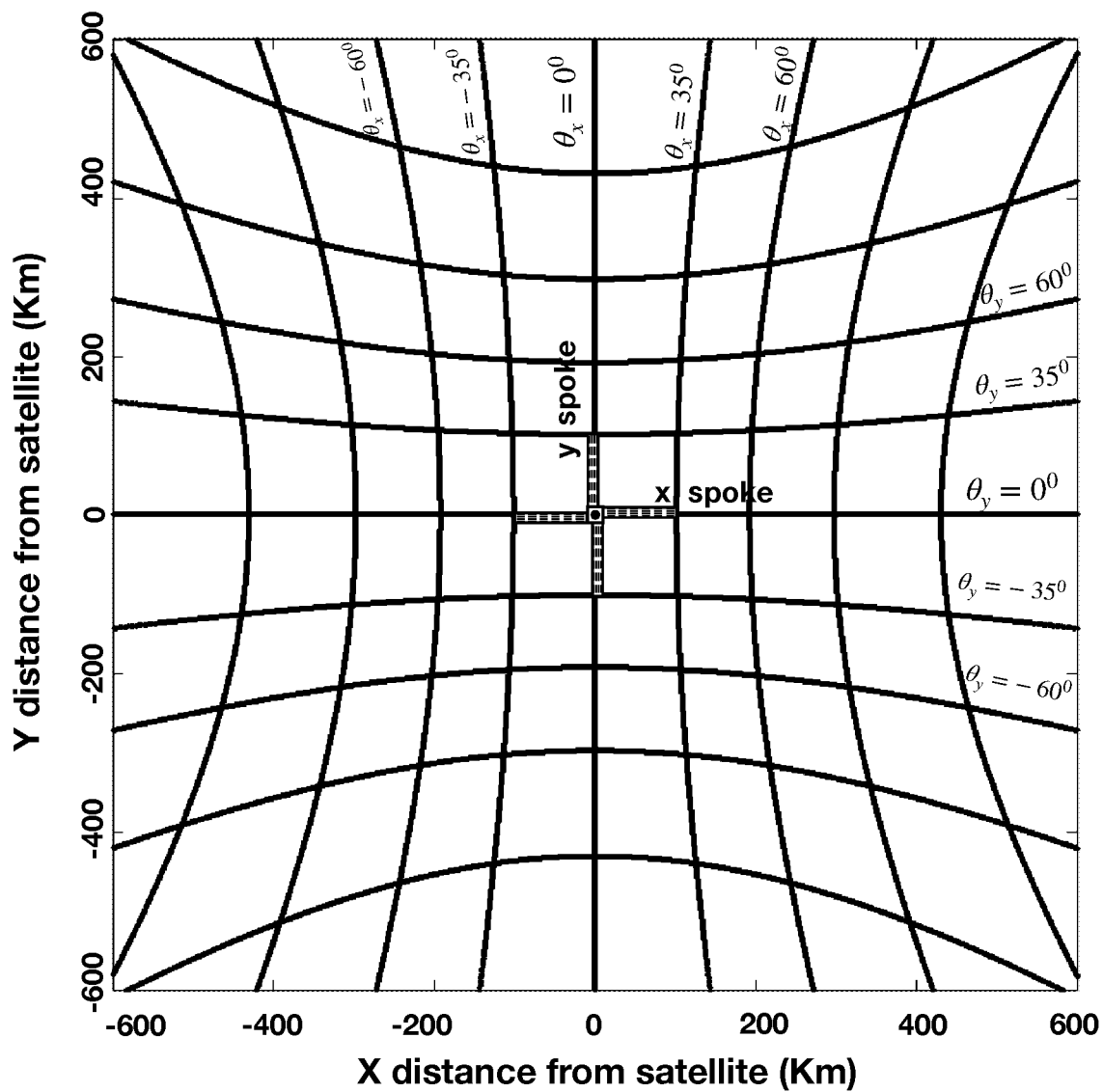
FIG. 16 illustrates a contour plot of the radio beam energy for a two spoke linear antenna array.

For clarity, the orbital frame of reference is used for discussion of geometric concepts as shown in FIG. 15. The azimuth angle is defined as the angle of propagation of the radio wave relative to the direction of the orbital plane. The elevation angle is defined as the angle of propagation of the radio wave relative to the −Z axis of the orbital frame of reference. When observing the beam patterns from earth, the beam contours of maximal beam energy are parabolic in shape since the phase difference of the radio waves arriving at consecutive antennas are a function of both the azimuth and elevation angles of the received radio waves in the spoke frame of reference. The phase difference of the radio wave carrier for consecutive antennas spaced half a wavelength apart along a linear antenna array is computed as:

$$\text{phase difference} = \pi \cos(\text{azimuth}\_s)\sin(\text{elevation}) \quad \text{Equation 1}$$

where azimuth_s is the azimuth angle in the spoke frame of reference (azimuth_s=0° is a radio wave arriving along the length of the spoke). FIG. 16 illustrates several beam contours for 9 beams formed by each linear antenna spoke for a two spoke system with perpendicular spokes. These contours would be observed on flat ground and the contours were created assuming a satellite altitude of 600 km. Ox and Oy denotes the phase difference of the arrival radio wave between consecutive antennas for the x and y spoke respectively. The horizontal contours in the figure are formed by the spoke that is pointing in the Y direction and the vertical contours are formed by the spoke that is pointing in the X direction. In the orbital frame of reference, azimuth_x is defined as the azimuth of the x spoke and azimuth_y is defined as the azimuth of the y spoke. When the spokes are perpendicular, azimuth_x=azimuth_y+90°. The phase differences among consecutive antennas for the two spokes is pre-computed for each of the formed receive beams. For the two spoke configuration, we get two equations and two unknowns when an endpoint symbol transmission is received by a beam from each spoke. The equations are:

$$\text{phase difference}(y \text{ spoke}) = \pi \cos(\text{azimuth}\_sy)\sin(\text{elevation}) \quad \text{Equation 2}$$

$$\text{phase difference}(x \text{ spoke}) = \pi \cos(\text{azimuth}\_sx)\sin(\text{elevation}) \quad \text{Equation 3}$$

where azimuth_sy is the azimuth of the radio wave in the y spoke frame of reference and azimuth_sx is the azimuth of the radio wave in the x spoke frame of reference. Assuming that the pitch and roll angles of the satellite is zero and converting this back into the orbital frame of reference, the following equations are obtained:

$$\text{azimuth}\_sy + \text{satellite yaw angle} = \text{azimuth} \qquad \text{Equation 4}$$

$$\text{azimuth}\_sx = \text{azimuth}\_sy + \phi \qquad \text{Equation 5}$$

where φ is the orientation of the x spoke relative to the y spoke and is 90 degrees when the spokes are perpendicular. The satellite yaw angle is defined as the azimuth angle of the Y spoke relative to the orbital plane. The known variables are the phase differences that generated the beams from the two spokes. The unknowns are the azimuth and elevation angles of the radio wave corresponding to a symbol transmission from the corresponding endpoint. From the above equations, the azimuth and elevation angles of the radio wave in the orbital frame of reference can be computed. These angles define the endpoint position on the ground since the satellite position and attitude relative to the earth is known by using the on board GPS radio, magnetic sensors and sun sensor as well as the attitude estimation method described later in the disclosure. Non zero pitch and roll angles can be integrated into the above equations with the proper rotation matrices. For each symbol received, the azimuth and elevation angles of the corresponding radio wave is computed as described above and a position coordinate is assigned to the symbol.

Figure 17:
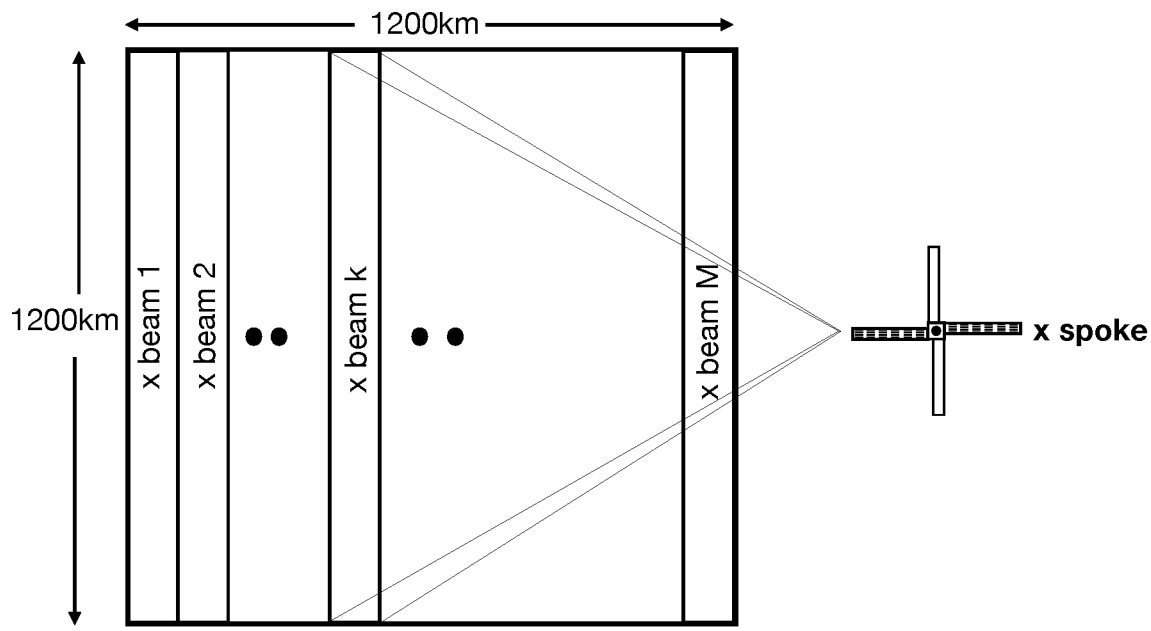
FIG. 17 illustrates the column beams generated by the x antenna spoke.
Figure 18:
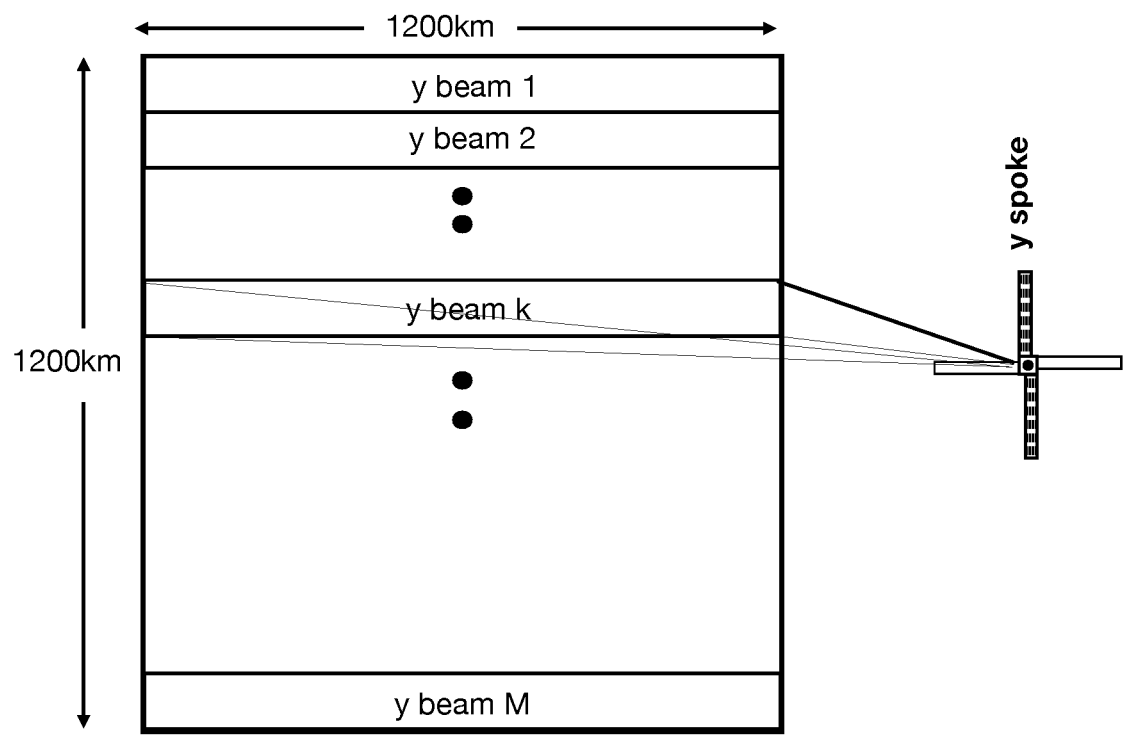
FIG. 18 illustrates the row beams generated by the y antenna spoke.

For illustrative purposes, the beam contours are assumed to be straight along the x and y axis. This simplification for illustrative purposes is shown in FIG. 17 for beam contours generated by the X spoke and FIG. 18 for beam contours generated by the Y spoke. When an antenna spoke is rectangular and has more than one antenna along the narrow dimension, the beam contours will look similar except that the beam width can be controlled in both the x and y dimensions. For simplicity this disclosure will focus on the case where perpendicular linear antenna arrays are used. When non linear, oblong shaped antenna arrays are used, the created beams are two dimensional instead of one dimensional. The same principals apply in solving for the position of an endpoint transmission in this case.

Figure 19:
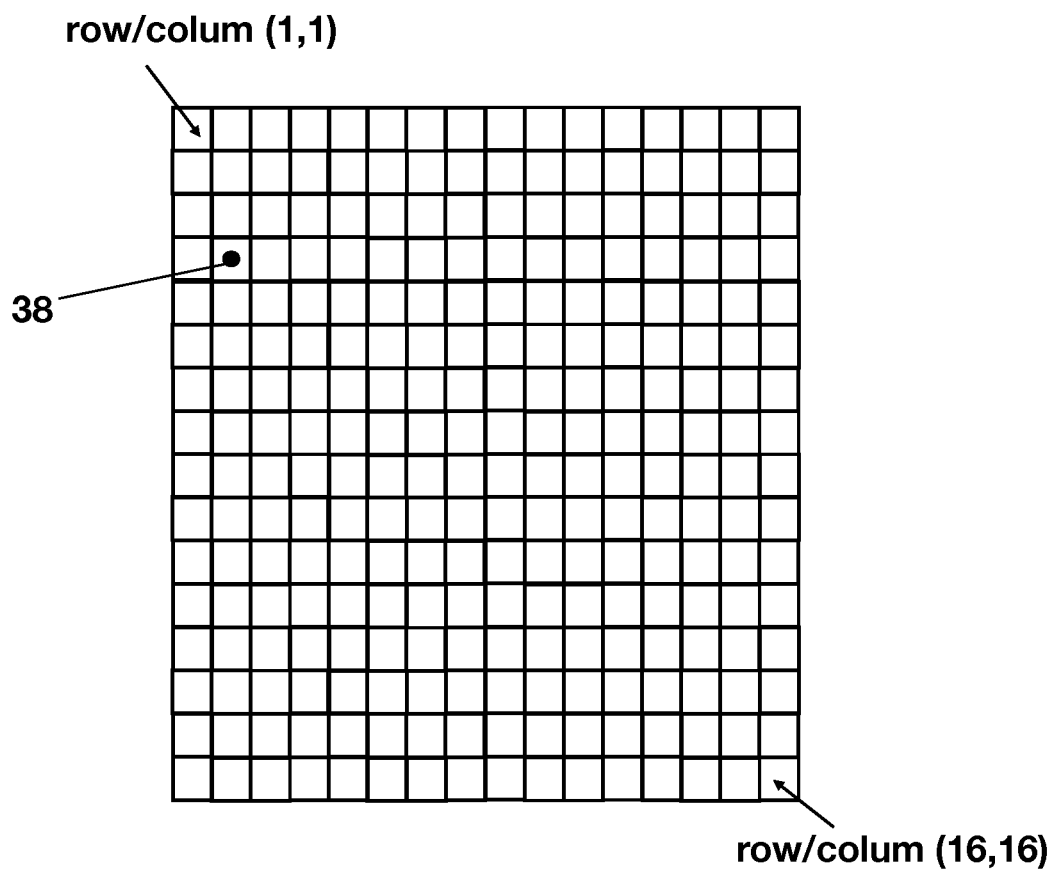
FIG. 19 illustrates a matrix of row and column beams generated by a two spoke linear antenna configuration.

In the simplified case where the beam contours are approximated to be straight lines, FIG. 19 illustrates the superimposed beam contours for two linear antenna arrays that are perpendicular to each other, creating an array of x column beams and y column beams. When signals arrive at the satellite at the x and the y linear antenna array spokes, the position of the source of the radio wave can be estimated by converting the phase differences observed along the antenna spokes into the angle and elevation angles of the propagated radio wave and then into a position on the earth. This can be visualized using the 2D matrix shown in the figure, where an endpoint transmits a symbol 38 from position row 4 and column 2. The row and column position would translate to a position on earth after adjusting for the non straight line beam contours as previously described.

Figure 20:
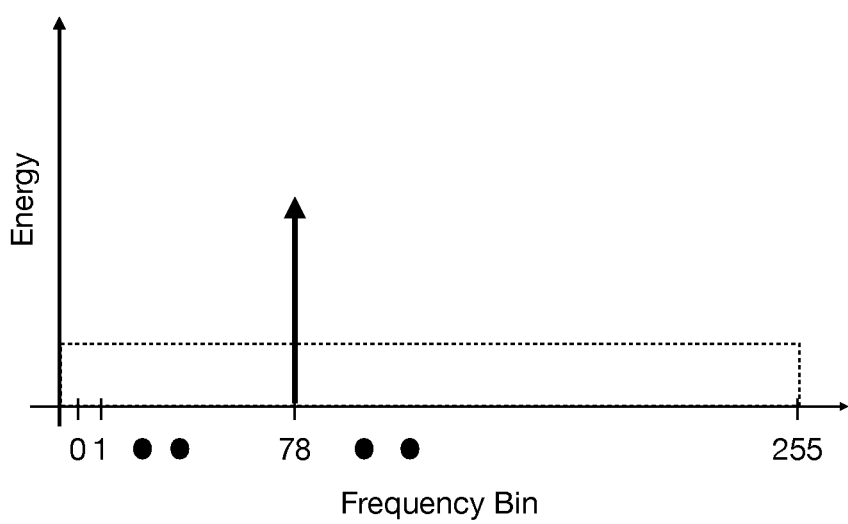
FIG. 20 depicts a Fourier Transform of an M-ARY FSK symbol with M=256.
Figure 21:
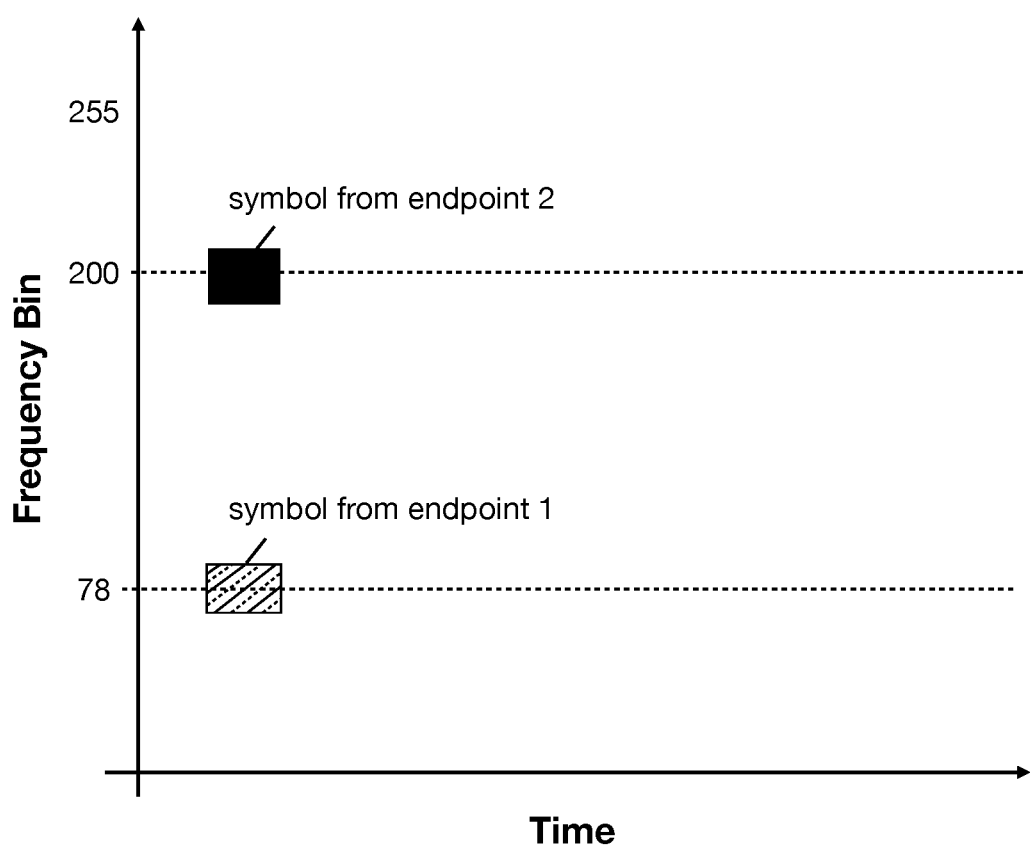
FIG. 21 depicts a Spectrogram of two M-ARY FSK symbols that overlap in time but not frequency.
Figure 22:
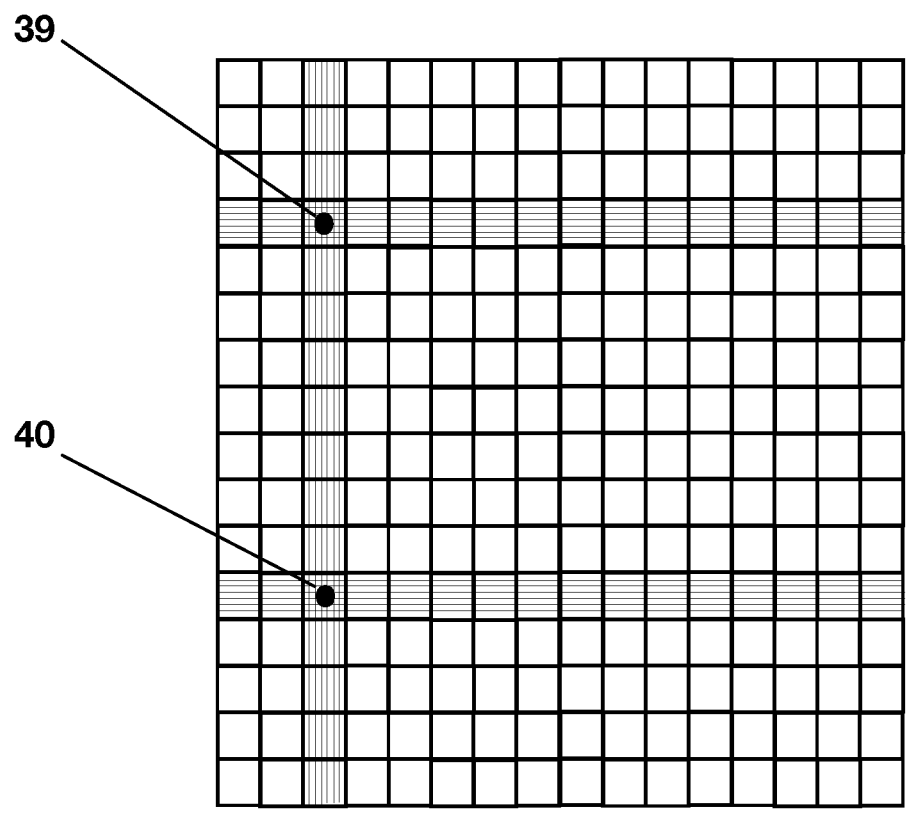
FIG. 22 depicts symbols from two endpoints being transmitted simultaneously and the symbols received by the same column antenna beam but different row antenna beams.

In radio communications, orthogonal modulation is used to improve the radio sensitivity for a target communication rate by spreading the available energy over as much bandwidth as is practical. The drawback of orthogonal modulation is that it suffers from low spectral efficiency. The combination of multi antenna spoke beamforming with orthogonal modulation lends itself to significant performance improvements over single antenna radios that use orthogonal modulation by improving the spectral efficiency of the system. An example of orthogonal modulation is M-ARY Frequency Shift Keying (FSK) modulation. The FFT of an M-ARY FSK symbol is shown in FIG. 20. $\text{Log}_2(M)$ bits are mapped to one of M orthogonal frequency tones and one of the possible tones is sent out over the communication channel to encode the bits. FIG. 20 illustrates the case when M=256, where 8 bits are encoded to a specific tone frequency. The bits '01001110'=78 are encoded by the tone frequency in the example. At the receiver, each received tone is then demodulated and translated back to the correct bits. In a shared wireless network, if two orthogonally modulated symbols that are sent from two different endpoints overlap in time, the receiver can be confused as to which symbol corresponds to which transmitter. FIG. 21 depicts a spectrogram of two symbols from two different endpoints which overlap in time but not in frequency. A symbol that overlaps in time with one or more other orthogonal modulated symbols can only be guaranteed to be decoded correctly if the symbol to be decoded does not overlap with other symbols over the range of orthogonal dimensions (for M-ARY FSK the range of orthogonal dimensions is the $2^M$ frequencies). The spectral efficiency of M-ARY orthogonal modulation using a single antenna receiver is approximately $\text{Log}_2(M)/M$ bits/sec/Hz. With multi spoke beamforming, to improve the spectral efficiency, symbols from different endpoints that overlap in time are assigned positions and can be differentiated based on each symbol position. This is illustrated in FIG. 22 which shows a first symbol 39 from a first endpoint picked up by row beam 4 and column beam 3, and a second symbol 40 from a second endpoint picked up by row beam 12 and column beam 3. If the two symbols overlap in time but not frequency, then the symbols can be differentiated and decoded individually since they are detected by unique pairs of row and column beams. To decode the two symbols successfully with a single antenna receiver, the symbols would need to not overlap in time or not overlap over the range of the orthogonal frequencies.

Figure 23:
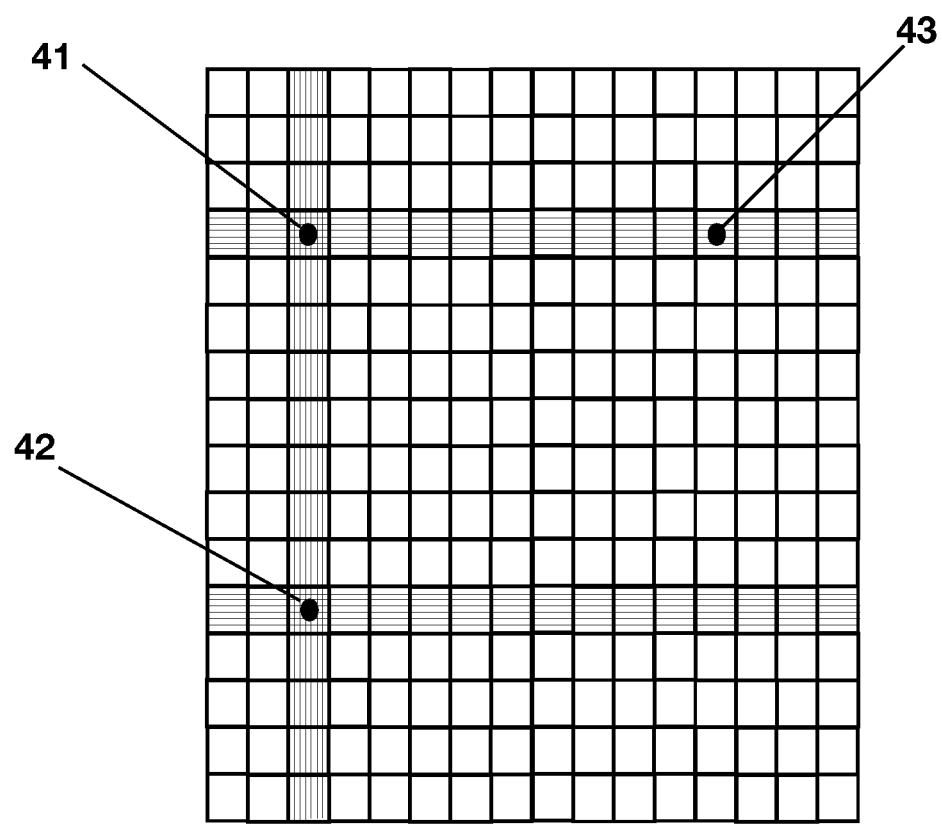
FIG. 23 depicts a decoding ambiguity case.

FIG. 23 illustrates a case where a first endpoint transmits a symbol 41 that is picked up by row beam 4 and column beam 3. A second endpoint transmits a symbol 42 that is picked up by row beam 12 and column beam 3. A third endpoint transmits a symbol 43 that is picked up by row beam 4 and column beam 13. If the second and third endpoint transmit their symbol at the same time as the first endpoint, and furthermore, if the second and third endpoint also transmit their symbol on the same frequency as each other (but different than the first endpoint to avoid symbol collision) there can be ambiguity when decoding the first endpoint's symbol. The decoder can't tell if the overlapping symbols from the second and third endpoint were actually one symbol that was picked up by the intersecting row and column beams. This case however is less likely since it requires symbol overlaps in both time and frequency. Ignoring this case, the spectral efficiency of a two spoke linear antenna receiver that uses M-ARY FSK modulation and N non overlapping beams per spoke has an upper bound of $N*\text{Log}_2(M)$ bits/sec/Hz, an improvement of N*M over a single antenna receiver that uses M-ARY FSK modulation. As a practical matter, satellite radio communications links have a limited elevation angle in which they work reliably due to increased endpoint to satellite ranges at larger elevation angles and lower antenna gains at higher elevation angles. For this analysis it is assumed that the elevation angle is limited to a maximum of 45 degrees. In this case, a 128 antenna element linear array can create around 64 non overlapping beams on the ground that covers a 45 degree elevation angle range. Including the cases where there are time and frequency overlaps of symbols as discussed earlier, a two spoke linear antenna array system with 128 antennas per spoke and 64 non overlapping beams using 64-ARY FSK modulation has been simulated to have approximately 700× better spectral efficiency compared to a single antenna receiver that uses 64-ARY FSK modulation. For the same amount of bandwidth, this translates to a 700× improvement in network capacity. The same two antenna spoke system using 64-ARY FSK modulation is simulated to have around a 150× improvement in spectral efficiency vs. a single antenna receiver that uses 2-FSK modulation. A standard square antenna array with the same volume as a 128 element per spoke, two spoke linear array would have an array size of around 16×16 antenna elements and generate 8×8=64 non overlapping beams on the ground over a 45 degree elevation range. A two spoke linear antenna array with 128 antenna elements per spoke, receiving 64-ARY FSK signals would have approximately 700/64=10.9× improvement in network capacity over the 16×16 square antenna array that receives 64-ARY FSK modulated signals and approximately 150/64=2.3× improvement in network capacity over a 16×16 square antenna array that receives 2-FSK modulated signals. Another advantage of using a plurality of spoke antenna arrays vs. square antenna arrays is that the positions of endpoints on the ground can be estimated with higher accuracy for the same antenna volume. The position accuracy along the x or y dimension is inversely proportional to the length of the antenna array along each of the dimensions. Two linear antenna arrays with 128 elements along each of the x and y dimensions would be able to estimate an endpoint's position approximately 8× more precisely than a 16×16 element square antenna array (assuming the same spacing between antennas for the linear and square array).

Another advantage of using orthogonal modulation is an improvement in energy efficiency. A 64-ARY FSK radio will need approximately 2× (3 dB in Decibel scale) less energy to send the same size packet compared to a 2-ARY FSK radio over an Additive White Gaussian Noise (AWGN) channel (for 10% probability of symbol error). In summary, the multi spoke beamforming receiver provides significant improvements in both network capacity and energy efficiency compared to single antenna receivers. The multi spoke architecture allows for a small volume antenna array that is easily stowable in a small satellite and still provides good network capacity and spectral efficiency.

Figure 24:
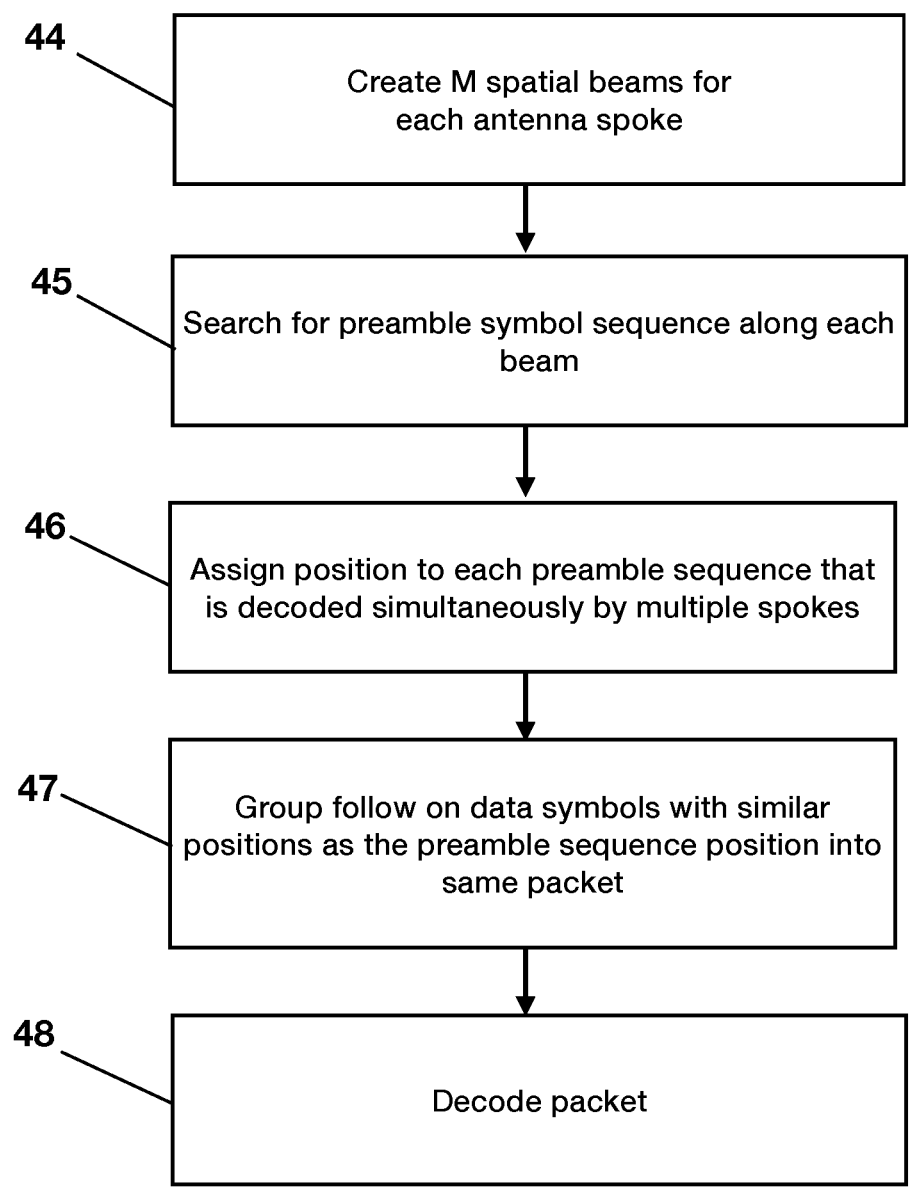
FIG. 24 illustrates a flowchart for decoding M-ARY orthogonal signals using multiple oblong shaped antenna arrays.

The multi spoke symbol decoding approach is not only applicable to M-ARY FSK modulation but also to any other orthogonal modulation scheme. FIG. 24 shows the flowchart for decoding any packet that uses orthogonal modulation. First M spatial beams are created for each antenna spoke 44, then for each beam created by each spoke, preamble detection circuitry 45 searches for a sequence of preamble symbols along both spokes and all beams. If a preamble sequence is detected simultaneously by two spokes, the preamble sequence is assigned a position 46. The system then looks for follow on data symbol transmissions that are assigned the same position as the preamble transmission 47. Finally consecutive symbols that have similar positions as the preamble symbol sequence are grouped together and the packet containing these symbols is decoded 48.

Figure 25:
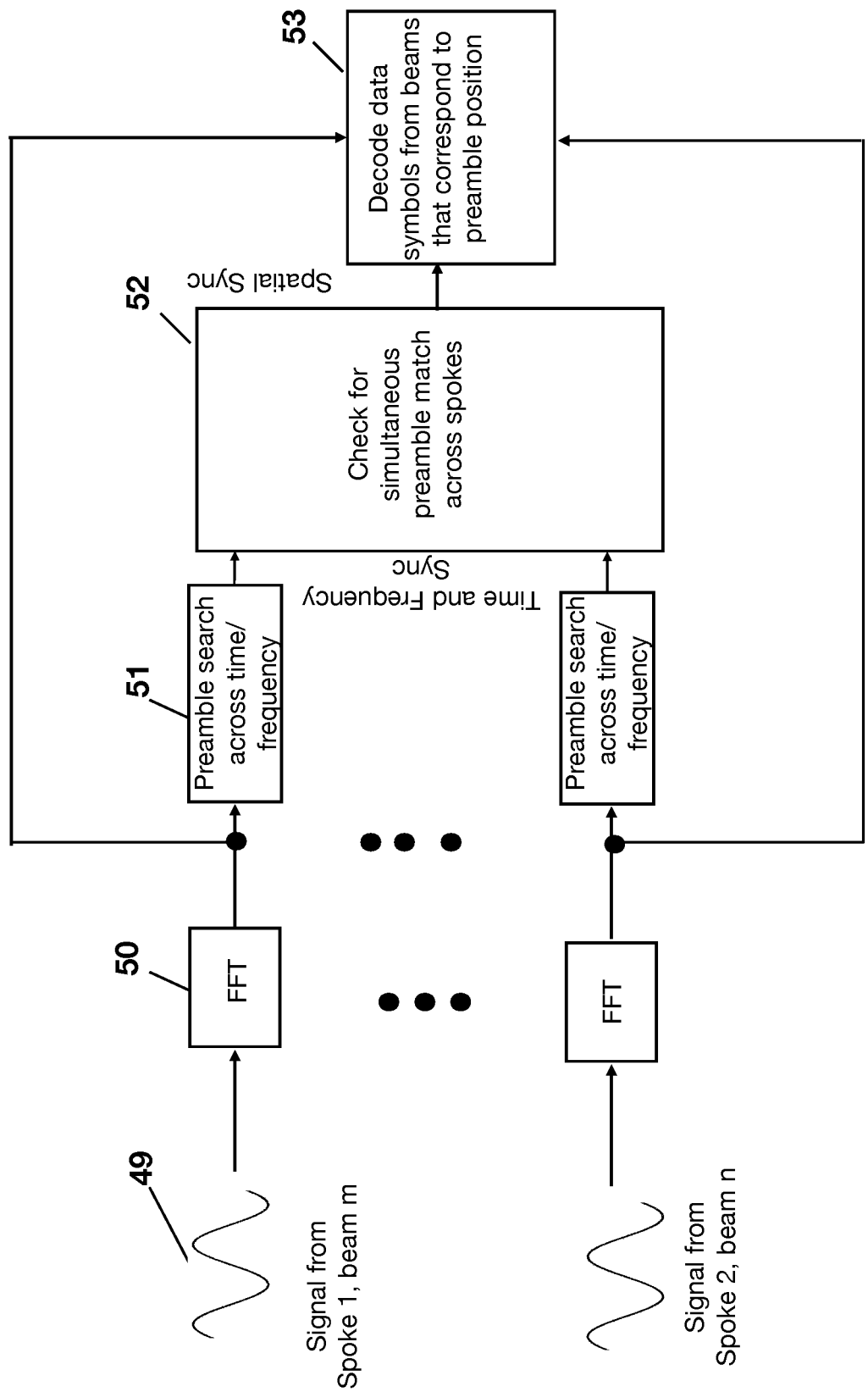
FIG. 25 illustrates a block diagram of an M-ARY FSK multi spoke signal decoder.

The orthogonal signal decoders for different orthogonal modulations is described in more detail in the following paragraphs. FIG. 25 shows the reception of an M-ARY FSK signal 49 where one of M orthogonal frequency tones are selected at the transmitter to encode a bit sequence. At the receiver, for each beam of each antenna spoke, the signal is fed into an FFT 50. In an embodiment, the sample rate of the incoming signal into the FFT is set to the bandwidth of the communication channel and the number of samples per FFT computation is set to the symbol duration multiplied by the sample rate. For each antenna spoke beam, a preamble detector 51 searches over time and frequency for the preamble symbol sequence. When the preamble detector detects a valid preamble, the circuit has obtained frequency and time synchronization with the incoming data packet. The preamble detection circuit outputs from all antenna spokes and beams is fed into a processor 52 which checks to see if there are valid preamble sequences that appear at the same time and frequency on receive beams of two different spokes. Once the processor detects a valid preamble sequence arriving on two different spokes at the same time, the decoder is now time, frequency and spatially synchronized. The figure shows an example where spoke 1 beam m and spoke 2 beam n both detect the preamble simultaneously. The decoder 53 then decodes the data symbols arriving at the proper time, frequency and space (intersection of the two beam contours on earth where the preamble was detected). FIG. 25 shows the case where the data symbols associated with a preamble sequence arrives from the same row and column beams that the preamble symbol sequence arrived from. It is important to note however that the row and column beams that receives the preamble symbol sequence is not necessarily the same row and column beams that receives the associated data symbols. This is only true if over the duration of the packet transmission, the satellite motion and variation of satellite attitude is small enough to not change the beams which receive the data symbols compared to the beams that received the preamble symbol sequence. In the embodiment where the beam weights are time varying and selected to counter the motion of the earth and to adjust for the satellite attitude, then the beams will track a fixed contour on earth and the same set of row and column beams that receive a preamble sequence will also receive the corresponding data symbols of a packet. During the decoding process, if a data symbol frequency does not match up among the two spokes or if there is more than one frequency that matches up among the two spokes, then the data symbol is declared an erasure. The packet can still be decoded by using a proper error correcting code that can correct a certain number of symbol errors and/or erasures.

Figure 26:
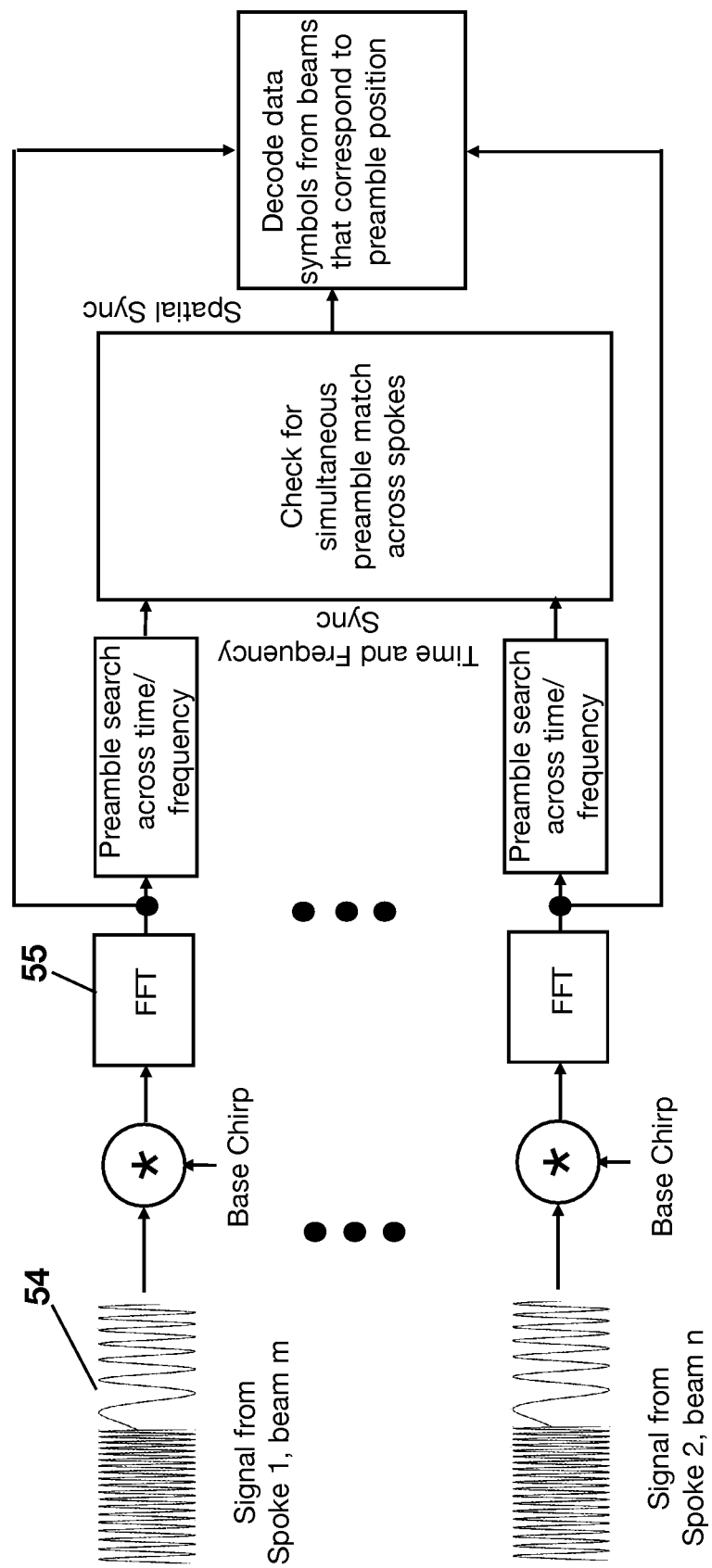
FIG. 26 illustrates a block diagram of a Chirp Spread Spectrum multi spoke signal decoder.

Another orthogonal signal that can be used with the multi spoke antenna array receiver is the Chirp Spread Spectrum signal. FIG. 26 shows a chirp spread spectrum modulated signal 54 that modulates bits based on a cyclical time shift of a base chirp signal (a chirp with 0 time delay). At the receiver, for each beam of each spoke the chirp signal is convolved by the base chirp signal. After convolution, when the received symbols line up in time with the base chirp, the resultant signal is simply an M-ARY FSK modulated signal. The convolved signal is then fed into an FFT block 55 and the remaining part of the decoding process is identical to the M-ARY FSK decoding process.

Figure 27A:
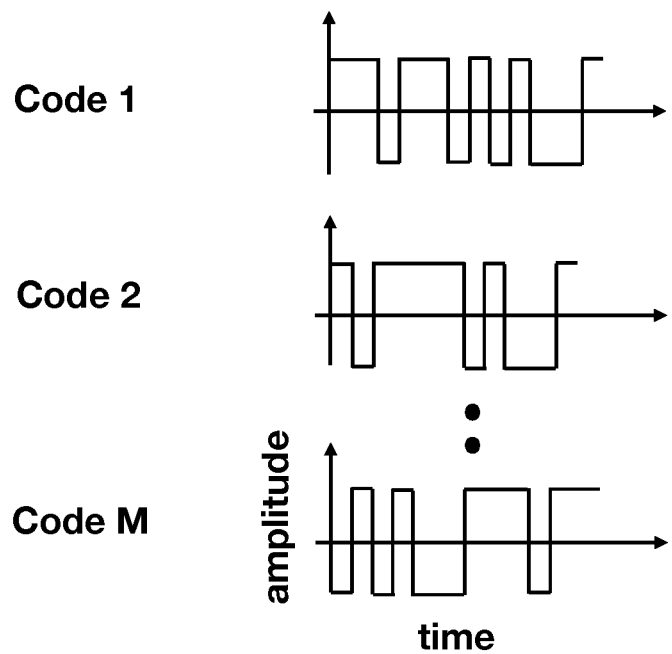
FIG. 27A illustrates sets of Direct Sequence Spread Spectrum signals that are orthogonal in the code domain.
Figure 27B:
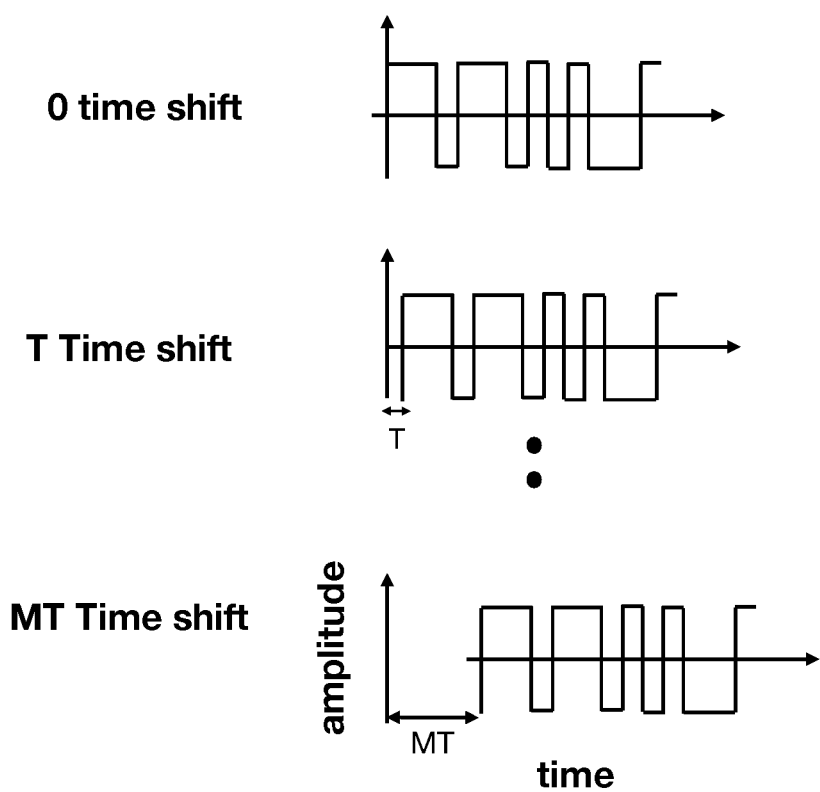
FIG. 27B illustrates time shifts of a Direct Sequence Spread Spectrum signal that is self orthogonal.

The above examples demonstrated orthogonal signaling over the frequency dimension (M-ARY FSK, Chirp Spread Spectrum). It is also possible to achieve orthogonal signaling over the time dimension, code dimension or a combination of frequency, time and code dimensions. To achieve orthogonality over the time and/or the code dimensions, Direct Sequence Spread Spectrum (DSSS) signals are typically used. As a brief background, to achieve orthogonality over the code dimension, M DSSS signals are generated. Each symbol is orthogonal to each other and each symbol encodes $Log_2(M)$ bits as shown in FIG. 27A. To achieve orthogonality over the time dimension, a DSSS signal with good self orthogonal properties is chosen, such that time shifts of the same code sequence are orthogonal to other time shifts for multiples of the chip period T as shown in FIG. 27B. Sets of DSSS signals that achieve orthogonality over both the time and code dimensions can be chosen as well. To achieve orthogonality over the frequency and time dimensions, a DSSS signal with good self orthogonal properties can modulate an M-ARY FSK signal. To achieve orthogonality over the frequency, time and code domains, a set of K orthogonal DSSS signals are chosen, where each DSSS signal also has good self orthogonal properties. Each DSSS signal modulates an M-ARY FSK signal. To encode $Log_2$ (M*K*T) bits per symbol, one of M of the FSK tones is selected, modulated by one of the K orthogonal DSSS signals and then time shifted by one of T time shifts. As more orthogonal dimensions are added, the decoder computational complexity increases.

Figure 28:
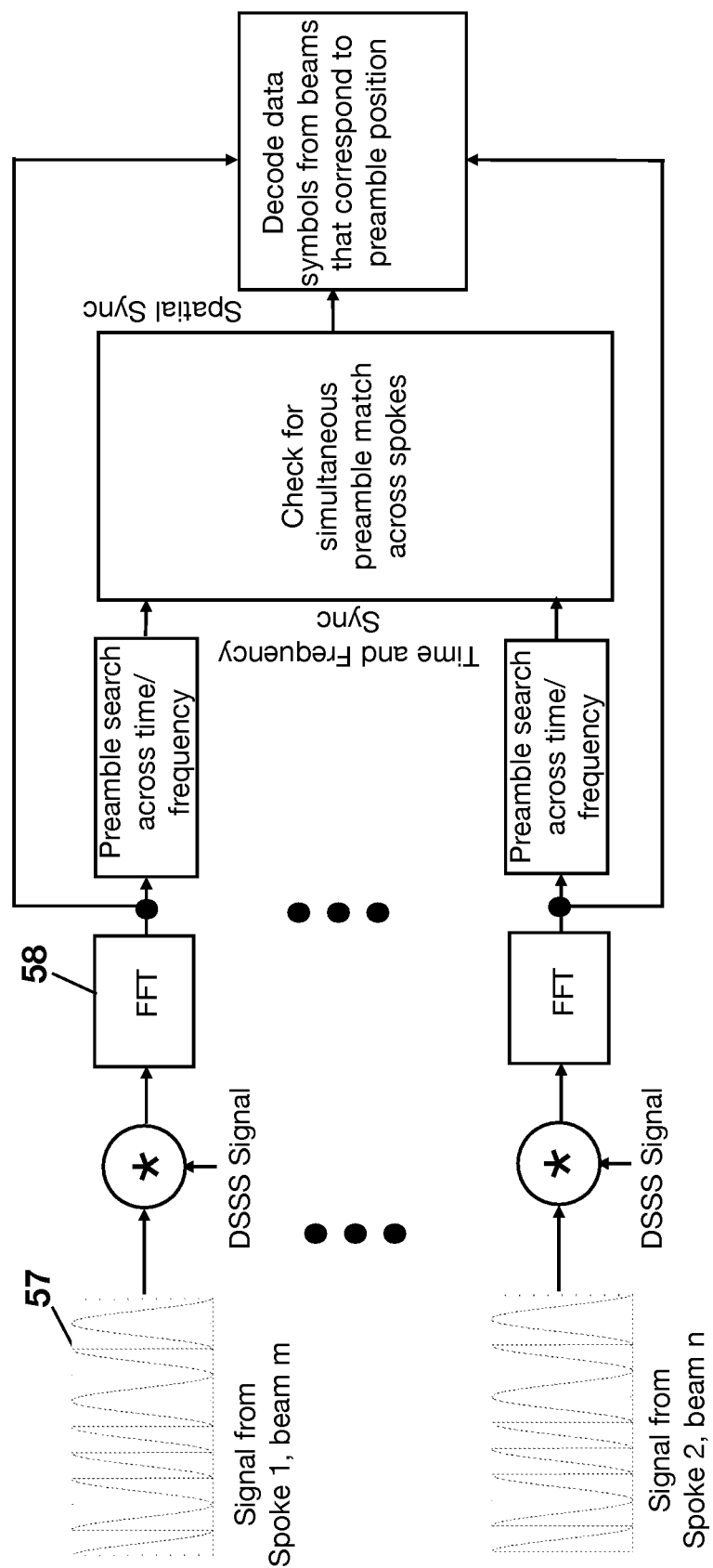
FIG. 28 illustrates a block diagram of a Direct Sequence Spread Spectrum multi spoke signal decoder where the incoming signal is a self orthogonal signal.

A decoder that can decode across orthogonal frequency and time dimensions is shown in FIG. 28. In the Figure, a DSSS signal with good self orthogonal properties modulates an M-ARY FSK signal. At the receiver, for each beam of each spoke, the received signal 57 is convolved with the DSSS signal matched filter. When the received symbol lines up in time with the matched filter, we are left with an M-ARY FSK signal. The signal is injected into an FFT block 58 and the remainder of the decoding process is the same as an M-ARY FSK decoder, except that bits can also be encoded in time shifts of the symbol.

Figure 29:
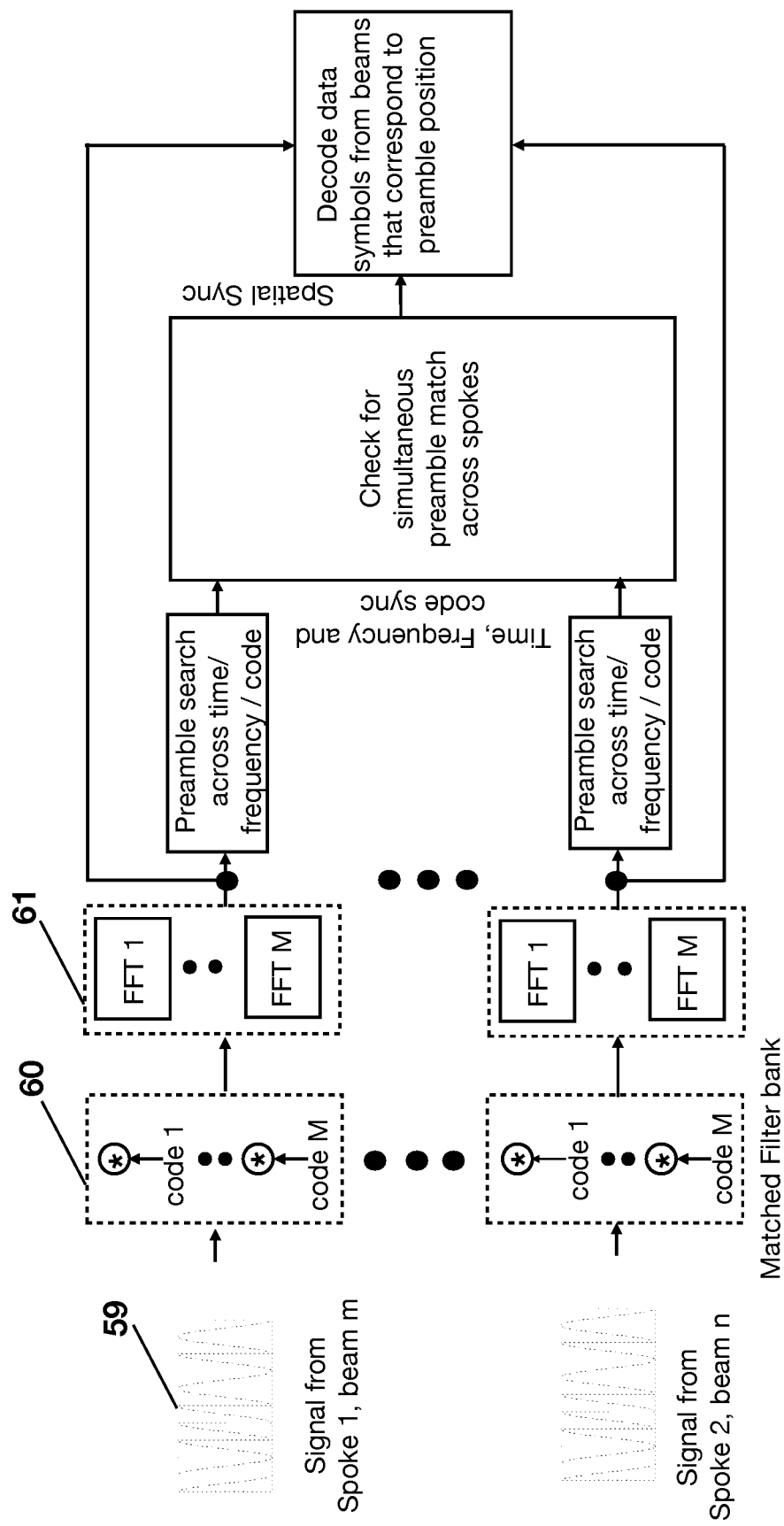
FIG. 29 illustrates a block diagram of a Direct Sequence Spread Spectrum multi spoke signal decoder where the signal set is orthogonal in the code dimension.

The above examples demonstrated orthogonal signaling over the frequency domain (M-ARY FSK, Chirp Spread Spectrum) and orthogonal signaling over the time and frequency dimensions (DSSS modulated M-ARY FSK signal with T possible time shifts of the data symbols). It is also possible to generate orthogonal signals over the code dimension, over the code and time dimensions, and over the code, time and frequency dimensions. A more computationally complex decoder that can decode symbols over all three dimensions is shown in FIG. 29. In the Figure, a DSSS signal is picked from an alphabet of K orthogonal codes, where each code has good self orthogonal properties and modulates an M-ARY FSK signal. A time shift T is also added to each transmission to encode bits along the time dimension. At the receiver, for each beam and each spoke, the received signal 59 is convolved with a bank of matched filters 60, where each matched filter is one of the K DSSS signals. When the received symbol lines up in time with one of the matched filters, we are left with an M-ARY FSK signal. Each of the matched filter outputs is injected into an FFT block 61 and the remainder of the decoding process is the same as an M-ARY FSK decoder, except that additional bits can also be encoded in time shifts of the symbol and in the code that was chosen for each symbol. The preamble detector now searches over time, frequency and the code dimensions during the preamble search process.

Figure 30A:
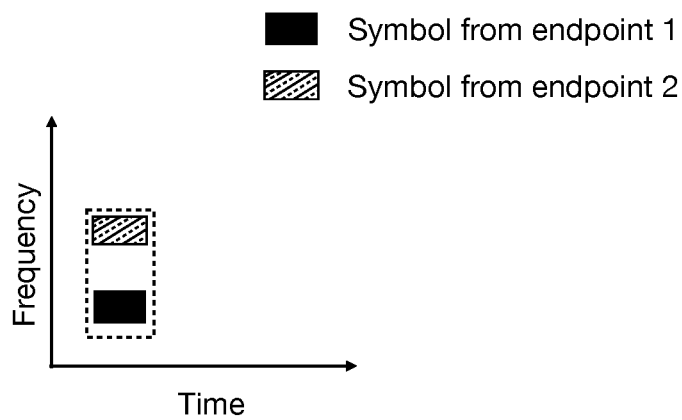
FIG. 30A illustrates orthogonally modulated symbols over the frequency dimension.
Figure 30B:
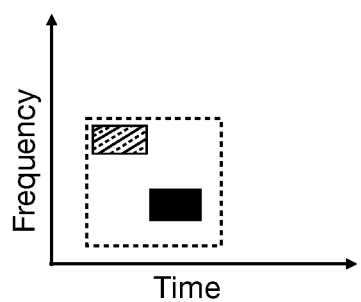
FIG. 30B illustrates orthogonally modulated symbols over the frequency and time dimensions.
Figure 30C:
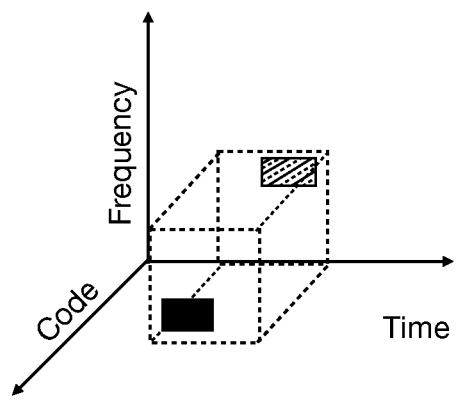
FIG. 30C illustrates orthogonally modulated symbols over the frequency, time and code dimensions.

FIG. 30A through FIG. 30C illustrates two endpoints transmitting symbols along different orthogonal dimensions. For orthogonal signaling over the frequency dimension as shown in FIG. 30A, the multi spoke array processing allows for resolving ambiguity that occurs when symbols don't transmit using the same frequency but do transmit over the same symbol frequency range used to encode the bits. For orthogonal signaling over the frequency and time dimensions as shown in FIG. 30B, the multi spoke array processing allows for resolving ambiguity that occurs when symbols from different endpoints don't collide in time and frequency but do transmit over the same time and frequency range that is used to encodes the bits. For orthogonal signaling over the time, frequency and code dimensions as shown in FIG. 30C, the multi spoke array processing allows for resolving ambiguity that occurs when symbols from different endpoints do not collide in time, frequency and code space but do transmit over the same time, frequency and code range that is used to encode bits. In general, the improved spectral efficiency/capacity improvement is independent of the type of orthogonal modulation used, it only depends on the number of symbols used in the alphabet to encode bits and the number of antennas used in the antenna array spokes.

Figure 31:
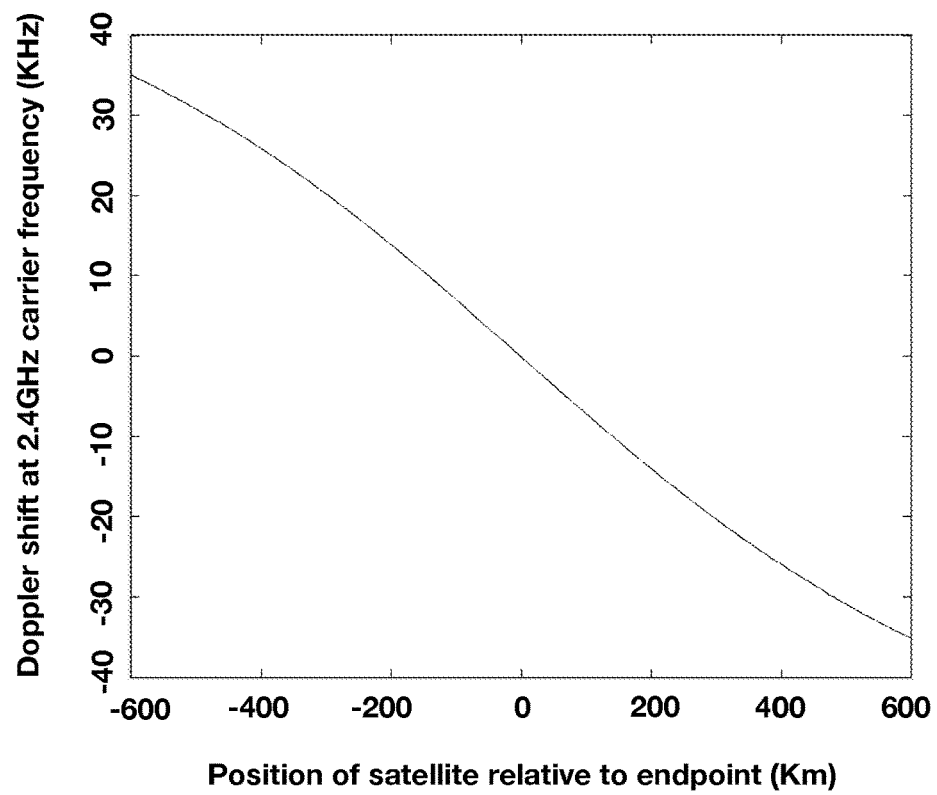
FIG. 31 is a plot of the Doppler shift of the radio carrier wave of a received endpoint packet as observed by a Low Earth orbiting satellite.
Figure 32:
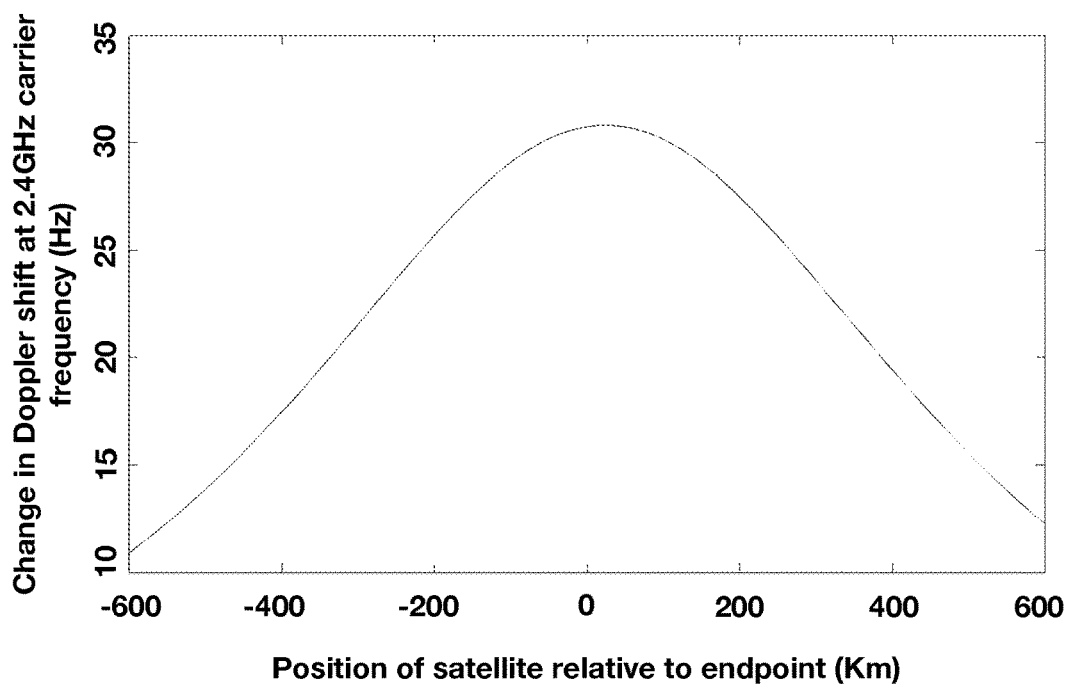
FIG. 32 is a plot of the change in Doppler shift of the carrier wave of a received endpoint packet as observed by a Low Earth orbiting satellite over a 50 mS preamble duration.
Figure 33:
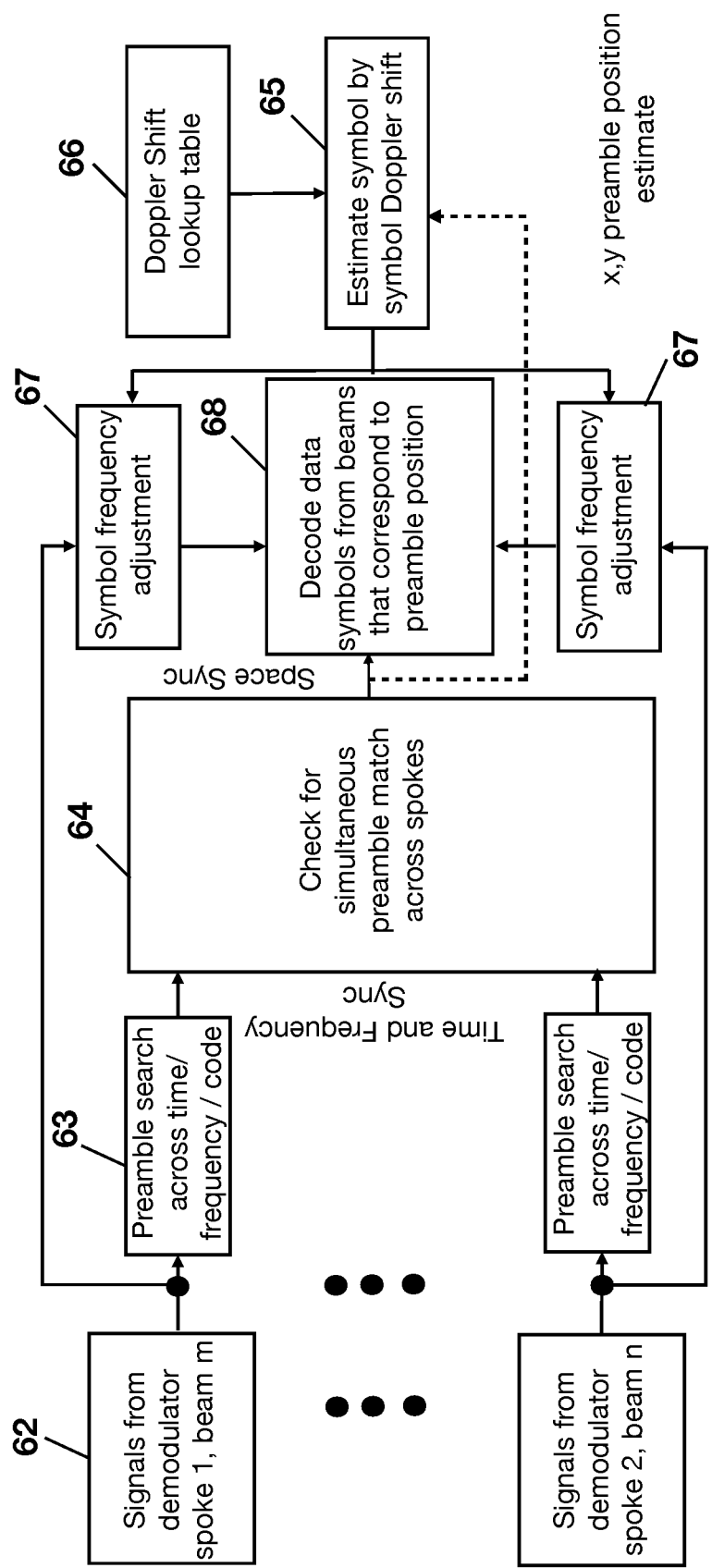
FIG. 33 depicts a block diagram of an M-ARY orthogonal signal decoder with Doppler frequency correction functionality.

As the satellite moves towards an endpoint that is transmitting a packet, the transmitter's observed carrier frequency will increase. The observed carrier frequency will decrease when the satellite is moving away from the endpoint. This change in observed frequency is due to the Doppler shift which is equal to v*f/c, where v is the relative velocity of the satellite to the endpoint, f is the carrier frequency and c is the speed of light. This Doppler shift is shown in FIG. 31 for a satellite that varies in position from −600 km to 600 km relative to the position of the endpoint along the direction of travel. For a 2.4 GHz carrier frequency, the Doppler shift varies from around −35 KHz to 35 KHz for a satellite altitude of 600 km and velocity of 7.6 km/s. If the frequency shift was constant, it would not be a problem since the receiver would be able to lock onto the carrier frequency when searching for the preamble. The challenge becomes dealing with the change in Doppler shift over multiple data symbols which can cause the receiver to lose frequency synchronization and erroneously decode symbols. This is clear to see in the M-ARY FSK case as an example, where assuming each symbol is spaced by 125 Hz, a small change in Doppler shift of around 125 Hz can cause the bits to be decoded incorrectly. The change in Doppler frequency for a carrier frequency of 2.4 GHz and over a typical preamble duration of 50 mS is shown in FIG. 32. As shown in the figure, the worst case frequency change over the duration of the preamble is around 30 Hz. The preamble detection circuit would still be able to lock onto the preamble even with this shift and would be impacted with only a small degradation in performance (around 0.5 dB reduction in preamble detection sensitivity for 8 mS long symbols). The process of Doppler correction for an orthogonal or non orthogonal signal decoder is shown in FIG. 33 which works for all orthogonally and non orthogonally modulated signals including but not limited to M-ARY FSK, Chirp Spread Spectrum, Direct Sequence Spread Spectrum, BPSK and QPSK signals. Multiple signal demodulators 62 processes the incoming signals from all of beams and every spoke. A preamble detector 63 operates along each beam and searches for a sequence of preamble symbols. When preamble detections occur simultaneously on a row and column beam, the position of the preamble transmission is estimated 64. The figure shows an example where spoke 1 beam m and spoke 2 beam n both detect the preamble simultaneously Using the preamble position estimate, the change in Doppler frequency shift for the remainder of the packet data symbols is estimated 65 by looking up the deterministic Doppler frequency variation over time curve 66 for the estimated endpoint position. Instead of a lookup table the Doppler frequency variation over time can be computed analytically as a function of the endpoint position relative to the satellite position and the known satellite velocity. Each data symbol that is received from the correct spatial position after the preamble sequence is then frequency adjusted 67 based on the estimated Doppler correction factor that is computed from the Doppler frequency variation over time curve. The frequency adjusted symbols are then sent to the packet decoder 68 which translates the data symbols into bits, and optionally applies bit de-interleaving and error correction to the bits.

Figure 34:
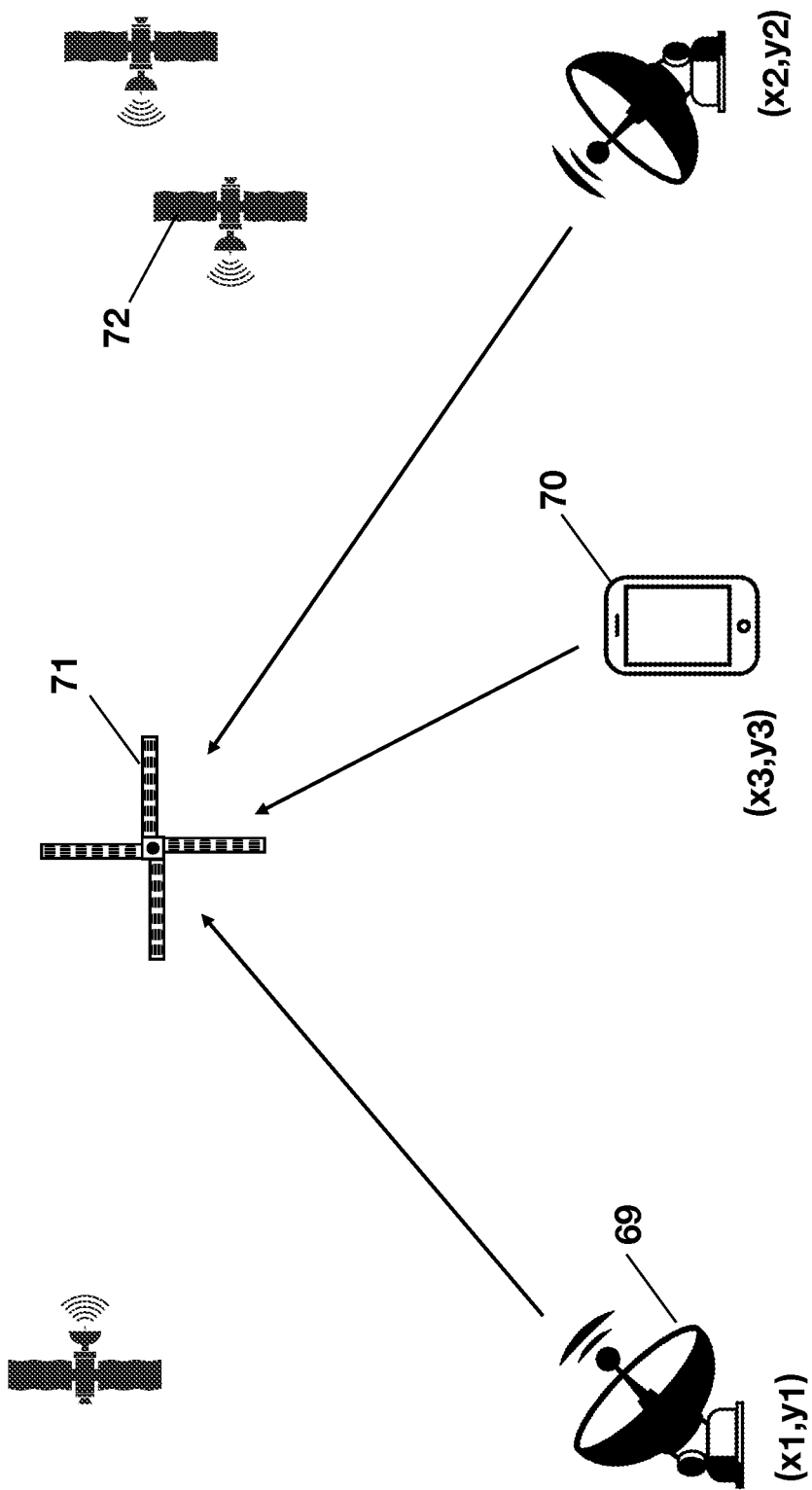
FIG. 34 depicts an architecture for satellite attitude estimation using ground based transmitters with known positions.

Typically, satellites will use star trackers and magnetic sensors to estimate the satellites attitude (pitch, roll and yaw). Satellites can use a radionavigation system such as the Global Positioning System (GPS) to compute its three dimensional position coordinates. However the position and attitude estimates are not always very precise and it is beneficial to be able to estimate the satellite position and attitude using additional means. To do so, the proposed system relies on a plurality of radio transmitters on the ground with known positions. The ground based transmitter position can be either static or dynamic as shown in FIG. 34. These ground based transmitter positions can be estimated either in real time by using an on board GPS receiver or during the transmitter installation assuming that it is a static transmitter. The transmitters are either static transmitters 69 or mobile transmitters. Mobile transmitters can include standard smart phones 70 that have GPS for estimating their position and the ability to communicate with the satellite. The transmitters can also be endpoints on the ground that have integrated GPS receivers and can send their GPS position to the satellite 71. Any combination of radio transmitters with a known location can be used for satellite position and attitude estimation. These transmitters send a periodic message to the satellite, where the message contains the transmitter's position. To estimate the satellite position and attitude, six or more transmitters that are spread out far enough on the ground transmit their known positions at approximately the same time to the satellite. If the satellite position is already known using a radionavigation system such as GPS 72 for example, then only three or more transmitters on the ground are needed to estimate the three attitude variables. The ground based transmitters can be time synchronized using GPS time synchronization or other means such as network time protocol for example. To allow for more precise satellite position or attitude estimation, the ground based transmitters should be spread out in both the latitude and the longitude directions by approximately the antenna array beam width spacing or more. The satellite antenna arrays receive the position information from the ground based transmitters. The satellite combines the position information received from the ground based transmitters together with the angle of arrival estimates of each transmitter's transmission. The equations can be solved for the unknown position and attitude variables (elevation, azimuth, range, pitch, roll and yaw). With more than six transmitters on the ground spaced far enough apart such that each transmitter is at least a beam width apart from other transmitters, the set of equations is over-determined, and a least squares estimate can be computed to improve the accuracy of the satellite attitude estimate. If the transmissions from the ground based transmitters do not occur at the same time, a Kalman filter on the satellite integrates the position data from the ground transmitters along with satellite inertial measurements to compute an estimate of the satellite position and attitude. The position and attitude estimates can also be continuously updated by the Kalman filter in between transmissions since transmissions might not occur continuously to reduce the uplink bandwidth required. The position and attitude estimation computations can be done locally on the satellite or remotely on a server.

Figure 35:
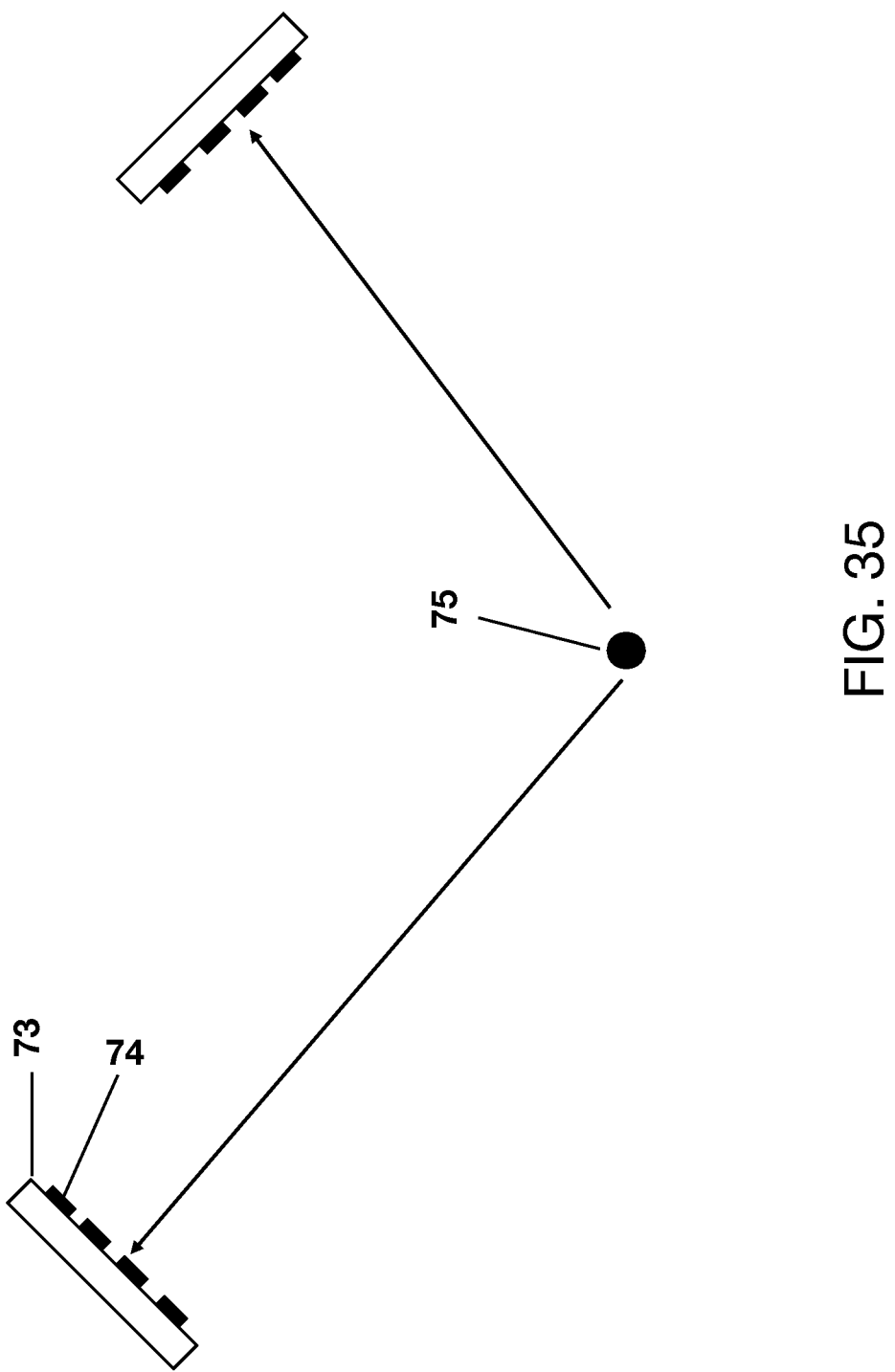
FIG. 35 depicts a terrestrial wireless network deploying two spatially separated linear antenna arrays.
Figure 36:
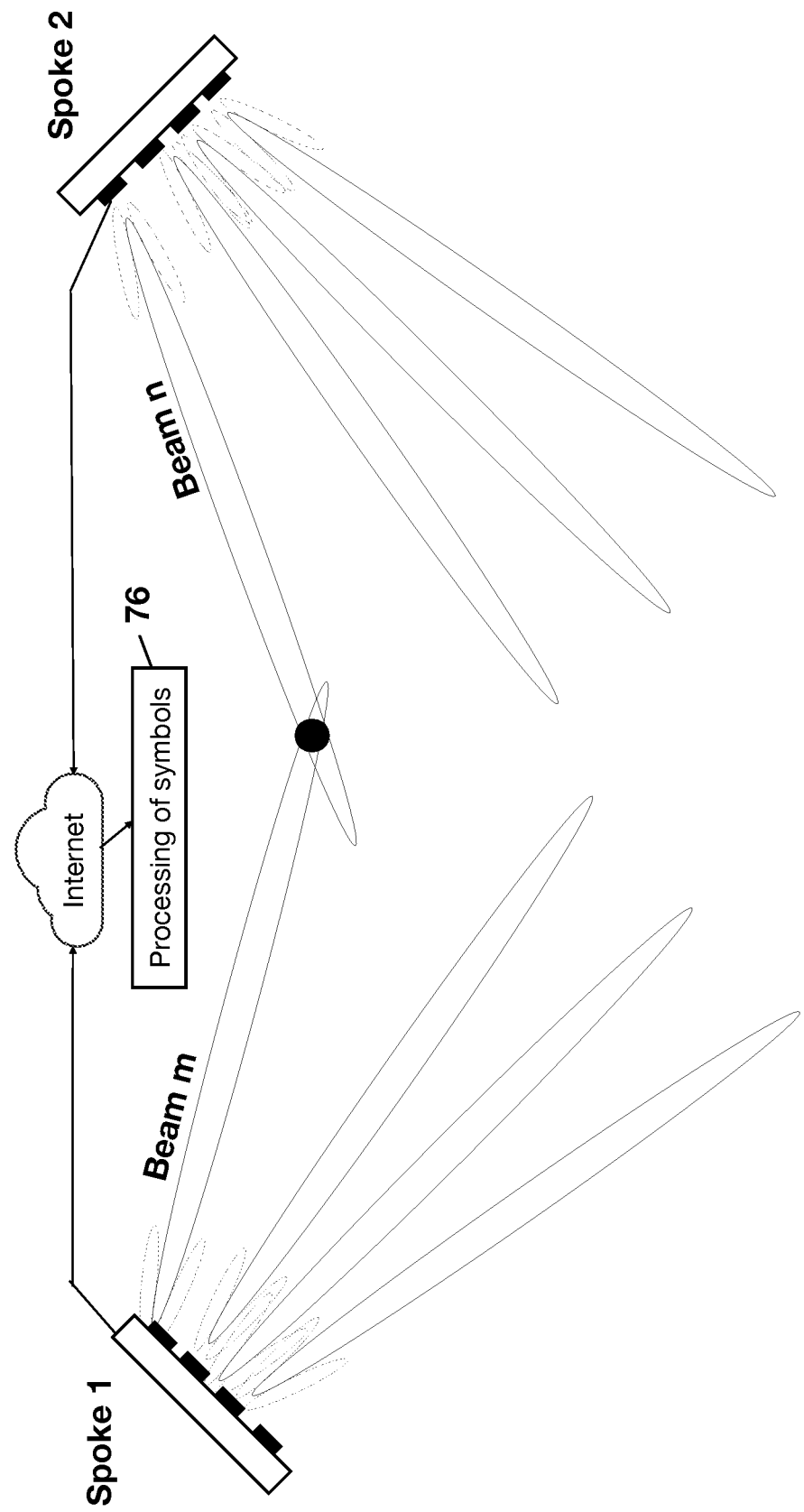
FIG. 36 depicts the radio beams formed by a terrestrial wireless network deploying two spatially separated linear antenna arrays.

Satellite based IoT networks work well for rural and suburban environments but face challenges in urban environments with radio wave blockage by tall buildings and higher levels of radio interference. For urban environments it is beneficial to complement the satellite network with a terrestrial network to offload the satellite network and provide more reliable coverage. The multi spoke beam forming technology discussed for satellites can also be applied to terrestrial networks with a small architectural change. Instead of having multiple oblong shaped antenna arrays co-located like in the satellite case, in the terrestrial case two or more antenna arrays are installed in geographically separate locations where each antenna array is mounted parallel to the ground and in an orientation that allows for creation of radio beams parallel to the earth. A top view of this architecture is shown in FIG. 35 and FIG. 36. Each antenna spoke 73 creates N receive radio beams, for illustrative purposes each spoke in the figure includes 4 antennas 74. When a preamble symbol sequence is sent from an endpoint 75, it is received by spoke 1, beam m and spoke 2 beam n as shown in FIG. 36. For each follow on data symbol that is transmitted by the endpoint that belongs to the same packet, the same beams from each spoke should pick up the symbols (assuming that the endpoint motion is fairly small during the packet transmission). Other endpoints that have different positions will transmit symbols that are picked up by different beams, and even when symbols overlap in time, they can be differentiated spatially, similar to the satellite case. In the satellite case, when multiple data symbols arrive at the antenna arrays, the decoding can be done locally. In the terrestrial case, since the antenna arrays are spatially separated, the symbols need to be transmitted over wired or wireless means and processed either at a processor node 76 that is co located with one of the antenna spokes or a geographically separate location. The antenna spoke data can also be routed through the internet to the processing node. Similar to the satellite case, the terrestrial antenna spoke positions and orientations can be estimated using multiple transmitter nodes on the ground with known positions that are spatially separated such that each transmitter's radio transmission is picked up by different receive beams. If the yaw angles of the antenna arrays are known but the positions of the arrays are not known, two transmitters with known positions would be needed to estimate the unknown antenna array positions. If the yaw angles of the antenna arrays are also not known, four transmitters would be needed for a two antenna array system. Unlike the satellite case, in the terrestrial case, this calibration only needs to be done once since the terrestrial antenna arrays are static. In the terrestrial antenna array calibration case, a single transmitter can also be used in multiple positions and the transmissions can be done sequentially and combined by the terrestrial antenna arrays for position and attitude estimation.

The multi spoke decoding process can also be applied to oblong antenna arrays mounted on other platforms such as aircrafts. Additionally, the decoding process can leverage multiple antenna beams, where each antenna beam is generated from a different platform. For example, one beam can be generated from an antenna array that is mounted on a base station on the ground and a second antenna array can be mounted on a satellite. The preamble symbol sequence and data symbol detections can occur at the various antenna arrays and the detections can be sent to a server or other location to aggregate the detections and apply the decoding methods described in this disclosure.

Figure 37:
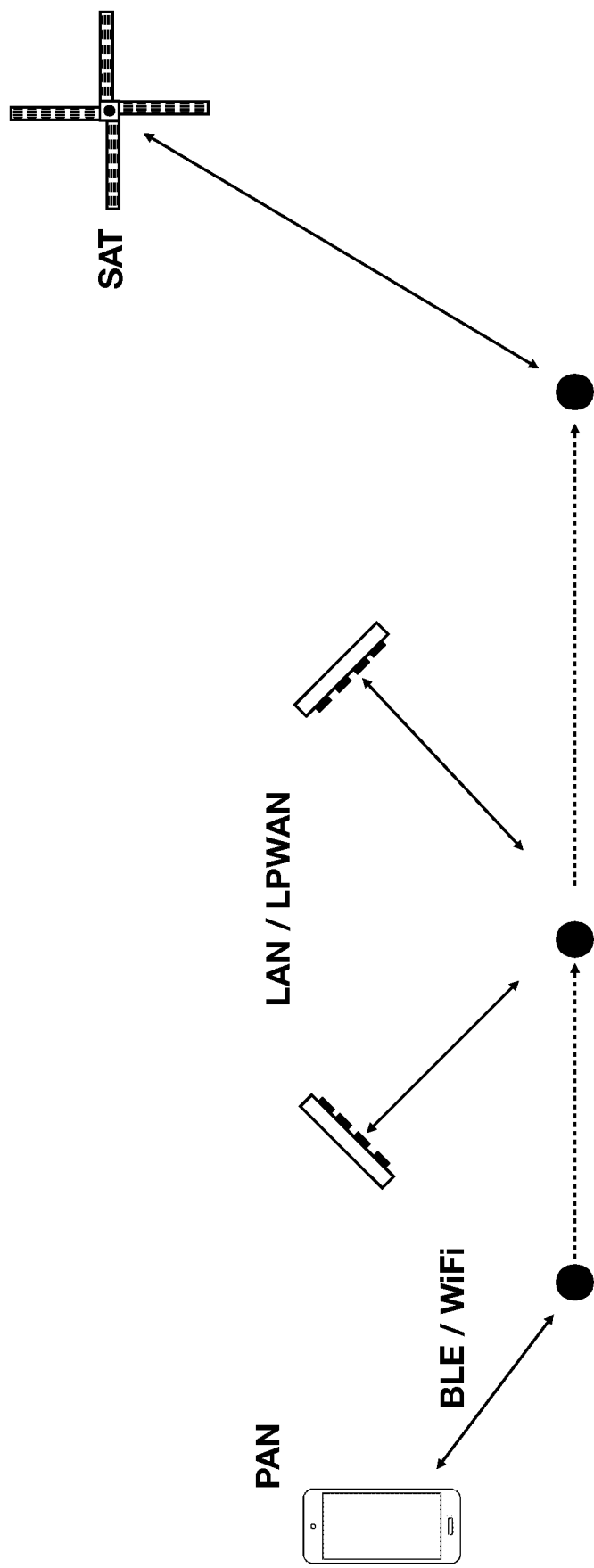
FIG. 37 depicts an endpoint automatically switching between a Bluetooth Low Energy or WiFi network and a terrestrial LPWAN and a satellite LPWAN using the same radio.

There are advantages to having a single radio that can communicate over a broad range of networks, all the way from personal area networks (PAN) like Bluetooth Low Energy (BLE) to longer range Local area networks (LAN) like WiFi to longer range terrestrial low power wireless networks (LPWAN) and finally to satellite networks. In order to enable the seamless transition between networks, the endpoint radio first attempts to establish communications with the lowest power network which is typically the PAN or LAN network. If communications cannot be established, the radio then attempts to communicate with the terrestrial LPWAN network. Finally, the endpoint radio sends its message to the satellite network if no other network is available. This is shown in FIG. 37.

Figure 38:
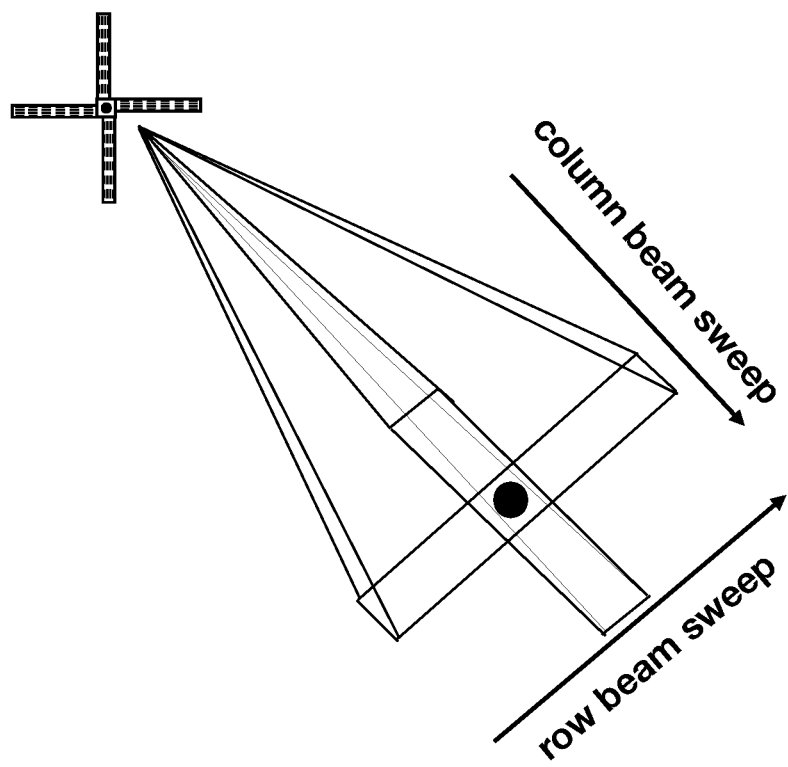
FIG. 38 depicts a satellite with two antenna arrays transmitting a column beam and a row beam that is scanned along the ground and is received by an endpoint, the endpoint using these signals to estimate its positioning.

The multi spoke beamforming architecture can also be applied in the transmit direction to both send data to endpoints and also provide endpoints with the ability to locally compute their position as an alternative to using a separate GPS receiver. The benefit of this is that the same radio that is used by the endpoints for transmitting to the satellite can be used by the endpoint to estimate its position locally. While the endpoint position is also estimated at the satellite when the satellite receives endpoint packet transmissions, there are cases where it is beneficial for the endpoint to compute its position locally without needing to send a packet to the satellite. An example is a geo-fencing application where an endpoint only needs to transmit a packet up to the satellite when it is outside of a certain geographic region. In this case it is more energy efficient for the endpoint to only transmit when it is confident that it is outside of the geofence boundary. In order to implement this functionality, this process is illustrated in FIG. 38. A beam is generated from one of the antenna spokes and swept along the direction that the spoke is pointing. In an embodiment the sweep angle is from an angle of −45 degrees to 45 degrees in the elevation direction. The number of beam positions along the sweep should be enough so that every point on the ground will get strong coverage at some point along the sweep. At each step of the beam, the antenna array sends a beacon packet which contains the time, the satellite position, the beam position and optionally a terrain correction factor. The terrain correction factor provides an estimate of the local terrain elevation profile so that this can be factored in when estimating the endpoint position. To estimate the endpoint position, the endpoint needs to receive information from at least two antenna spokes. Each antenna spoke independently sweeps the generated beam in space. Collisions between beams is avoided by time multiplexing the packet transmissions from each of the beams. The endpoint integrates this information from multiple antenna spokes to estimate its position. To save power, in one embodiment, the endpoints are provided with ephemeris data in the beacons which lets the endpoints know at what times satellites will be above them and when to expect the next beams to arrive at their locations. This allows the endpoints to sleep as long as possible before waking up their radios to listen for the next beacons to arrive. Ephemeris data can also be loaded into the endpoint by other means such as a nearby smartphone or cellular network.

Figure 39A:
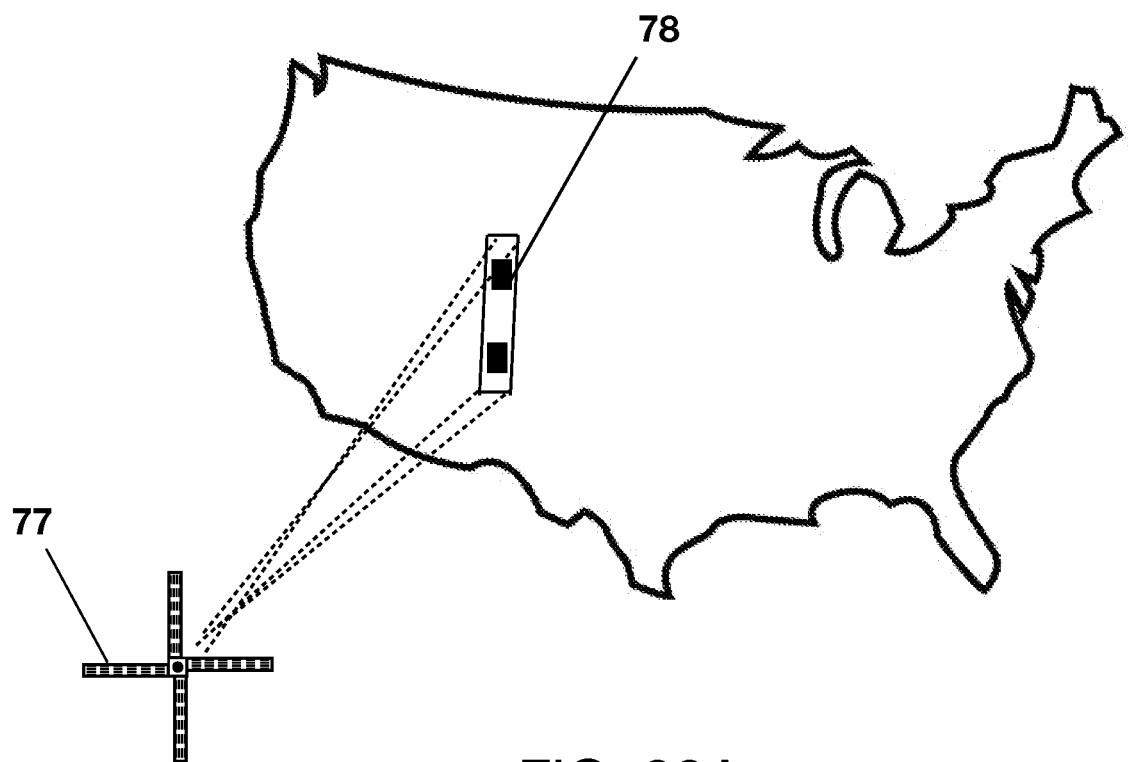
FIG. 39A depicts a satellite flying over the United States of America with two urban areas contained within a beam formed by the x antenna spoke.
Figure 39B:
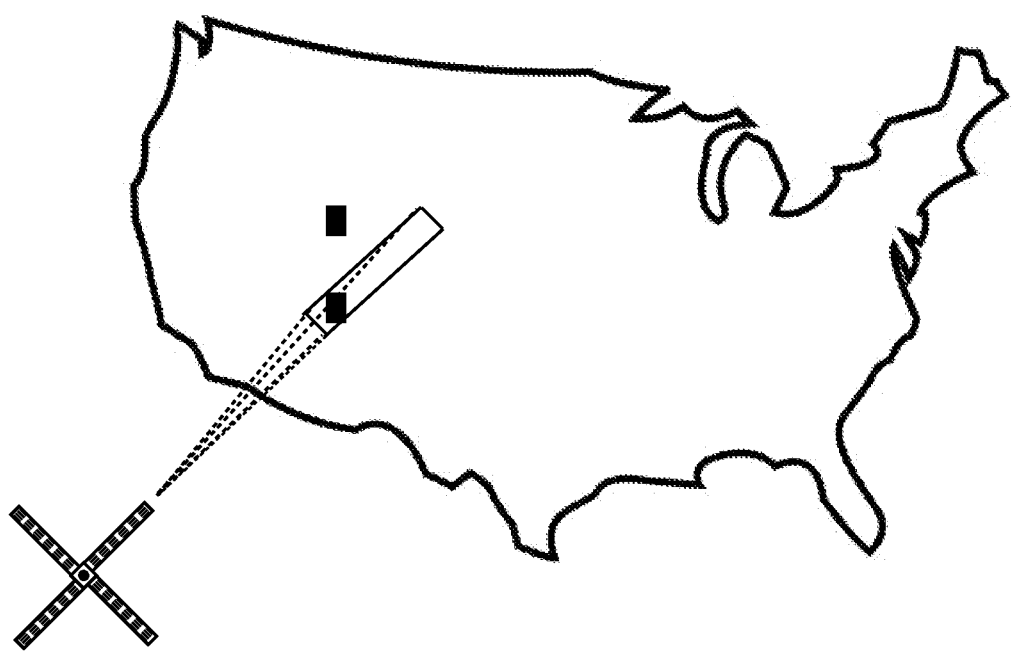
FIG. 39B depicts a satellite flying over the United States of America with one urban area contained within a beam formed by the x antenna spoke.

When operating a radio in the unlicensed band, the radio needs to contend with external interference that arises from multiple potential sources. For example, when operating in the 2.4 GHz unlicensed band, other interference sources include WiFi radios, Bluetooth radios and microwave ovens. A satellite orbiting over the earth that is integrated with the multi spoke antenna array architecture creates beams on the earth that are fairly narrow in width. The narrower the beam width, the more interference that the antenna array can spatially filter out, improving the performance of the satellite based gateway receiver. There are certain cases where an antenna beam might still contain significant interference. For example, FIG. 39A illustrates the case where a satellite 77 is flying over the United States of America and a beam generated by the x spoke contains two urban areas 78. An urban area typically contains significantly more sources of interference than rural areas. It is thus beneficial to develop approaches that reduce the interference that each antenna array beam picks up. One approach to reduce the received interference is to find the optimal yaw angle of the satellite such that the interference picked up by the antenna array beams is minimized. FIG. 39B illustrates the case where the satellite yaw angle is rotated by 45 degrees so that the antenna array beam only picks up one urban area instead of two urban areas, thus reducing the amount of interference picked up by the antenna array beam. To find the optimal yaw angle, the following approaches are taken. The first approach is to measure the interference levels measured at each antenna array beam as the satellite orbits the earth. When a second satellite orbits along approximately the same orbital plane, the second satellite can align itself to a different yaw angle relative to the first satellite. The second satellite then measures the interference level at approximately the same position that the first satellite measured the interference level. Interference measurements for each position along an orbital plane and each antenna spoke beam and each yaw angle is stored in memory and optionally can be sent down to the ground station and to a server which aggregates all interference measurements from all satellites in the network. Assuming that the interference levels stays relatively constant over time, the system can learn over time what the optimal yaw angle for each satellite is as it orbits above a certain location above earth. In an embodiment, the optimal yaw angles are computed on a server and sent back to the satellites using the ground station to satellite wireless communication links. Another approach is to average out the interference by having each satellite continuously rotate in yaw angle as it orbits the earth. In an embodiment the rotation period is chosen so that the rotation period is approximately equal to the packet duration.

Although the foregoing descriptions of certain preferred embodiments of the present invention have shown, described and pointed out some fundamental novel features of the invention, it will be understood that various omissions, substitutions, and changes in the form of the detail of the apparatus as illustrated as well as the uses thereof, may be made by those skilled in the art, without departing from the spirit of the invention. Consequently, the scope of the present invention should not be limited to the foregoing discussions.

The invention claimed is:

1. A method to decode orthogonally modulated symbols arriving at a plurality of oblong shaped antenna arrays, comprising:

creating a plurality of receive beams at a first of said antenna arrays;

creating a plurality of receive beams at a second of said antenna arrays;

detecting a preamble symbol sequence arriving at a first receive beam of said first antenna array;

detecting said preamble symbol sequence arriving at a second receive beam of said second antenna array;

converting said first receive beam into a first contour on the earth that said preamble symbol sequence transmission originated from;

converting said second receive beam into a second contour on the earth that said preamble symbol sequence transmission originated from;

determining a range of orthogonal dimensions for data symbols associated with said preamble sequence;

detecting a data symbol arriving within said range of orthogonal dimensions and originating from said first contour on the earth;

detecting said data symbol originating from said second contour on the earth; and decoding said data symbol.

2. The decoding method of claim 1 wherein said antenna arrays are mounted on a satellite.

3. The decoding method of claim 1 wherein said antenna arrays are mounted on an aircraft.

4. The decoding method of claim 1 wherein each of said antenna arrays is mounted on a structure that is affixed to the earth.

5. The decoding method of claim 1 wherein said antenna arrays are mounted on a combination of satellite, aircraft and ground based structures.

6. The decoding method of claim 1 wherein said data symbols are modulated using M-ARY Frequency Shift Keying modulation.

7. The decoding method of claim 1 wherein said data symbols are modulated using Chirp Spread Spectrum modulation.

8. The decoding method of claim 1 wherein said data symbols are modulated using Direct Sequence Spread Spectrum signals.

9. A method to correct for the Doppler shift of an incoming data symbol transmission arriving at a plurality of oblong shaped antenna arrays mounted on a satellite, comprising:

creating a plurality of receive beams at a first of said antenna arrays;

creating a plurality of receive beams at a second of said antenna arrays;

detecting a preamble symbol sequence arriving at a first receive beam of said first antenna array;

detecting said preamble symbol sequence arriving at a second receive beam of said second antenna array;

converting said first receive beam into a first contour on the earth that said preamble symbol sequence transmission originated from;

converting said second receive beam into a second contour on the earth that said preamble symbol sequence transmission originated from;

intersecting said first contour on the earth with said second contour on the earth to estimate a position of said preamble symbol sequence transmission;

using said preamble symbol sequence transmission position estimate to predict the Doppler shift of a data symbol associated with said preamble symbol sequence;

detecting said data symbol associated with said preamble symbol sequence;

adjusting the incoming carrier frequency of said data symbol with said Doppler shift prediction and decoding said data symbol.

\* \* \* \* \*